United States Patent
Wilf et al.

(10) Patent No.: US 8,650,103 B2
(45) Date of Patent: Feb. 11, 2014

(54) VERIFICATION OF A PERSON IDENTIFIER RECEIVED ONLINE

(75) Inventors: Saar Wilf, Tel Aviv (IL); Shvat Shaked, Jerusalem (IL)

(73) Assignee: eBay, Inc., San Jose, CA (US)

(*) Notice: Subject to any disclaimer, the term of this patent is extended or adjusted under 35 U.S.C. 154(b) by 1575 days.

(21) Appl. No.: 10/492,920

(22) PCT Filed: Oct. 16, 2002

(86) PCT No.: PCT/US02/32825
§ 371 (c)(1),
(2), (4) Date: Jul. 19, 2004

(87) PCT Pub. No.: WO03/034633
PCT Pub. Date: Apr. 24, 2003

(65) Prior Publication Data
US 2004/0243832 A1    Dec. 2, 2004

Related U.S. Application Data

(60) Provisional application No. 60/374,548, filed on Apr. 23, 2002, provisional application No. 60/329,518, filed on Oct. 17, 2001.

(51) Int. Cl.
*G06Q 40/00* (2012.01)
*G06F 21/00* (2013.01)
*G06Q 20/00* (2012.01)

(52) U.S. Cl.
USPC ............... 705/35; 705/44; 705/50; 705/67; 705/75; 705/76

(58) Field of Classification Search
None
See application file for complete search history.

(56) References Cited

U.S. PATENT DOCUMENTS

| | | | |
|---|---|---|---|
| 5,657,389 A * | 8/1997 | Houvener | 713/186 |
| 5,684,951 A * | 11/1997 | Goldman et al. | 726/6 |
| 5,757,917 A | 5/1998 | Rose et al. | |
| 5,774,525 A * | 6/1998 | Kanevsky et al. | 379/88.02 |
| 5,819,226 A | 10/1998 | Gopinathan et al. | |
| 5,826,241 A | 10/1998 | Stein et al. | |
| 5,913,210 A * | 6/1999 | Call | 1/1 |
| 5,913,212 A * | 6/1999 | Sutcliffe et al. | 1/1 |
| 5,966,351 A * | 10/1999 | Carleton et al. | 369/29.01 |

(Continued)

FOREIGN PATENT DOCUMENTS

| | | | | |
|---|---|---|---|---|
| EP | 1128628 A1 * | 8/2001 | | H04L 29/06 |
| EP | 1134707 | 9/2001 | | G07F 7/10 |

(Continued)

OTHER PUBLICATIONS

Qualcomm, "Eudora Mail Pro v3.0 for Windows User Manual", 1996, 3 pages.*

(Continued)

*Primary Examiner* — Gregory Johnson
(74) *Attorney, Agent, or Firm* — Schwegman, Lundberg & Woessner, P.A.

(57) ABSTRACT

A_system and method for verification of a person identifier received online is described. The method includes receiving a request for verifying a person identifier (PI1); and estimating whether (a) PI1 identifies the same person as another person identifier (PI2), (b) sender of PI1 is the same person as sender of PI2, and (c) PI2 identifies the sender of PI2.

32 Claims, 4 Drawing Sheets

(56) References Cited

U.S. PATENT DOCUMENTS

| | | | |
|---|---|---|---|
| 6,029,154 A | 2/2000 | Pettitt | |
| 6,095,413 A | 8/2000 | Tetro et al. | |
| 6,119,103 A | 9/2000 | Basch et al. | |
| 6,173,269 B1 * | 1/2001 | Solokl et al. | 705/35 |
| 6,233,565 B1 * | 5/2001 | Lewis et al. | 705/35 |
| 6,254,000 B1 | 7/2001 | Degen et al. | |
| 6,263,447 B1 | 7/2001 | French et al. | |
| 6,321,339 B1 | 11/2001 | French et al. | |
| 6,425,523 B1 | 7/2002 | Shem-ur et al. | |
| 6,496,936 B1 | 12/2002 | French et al. | |
| 6,560,581 B1 | 5/2003 | Fox et al. | |
| 6,853,988 B1 * | 2/2005 | Dickinson et al. | 705/75 |
| 6,957,259 B1 * | 10/2005 | Malik | 709/225 |
| 6,988,126 B2 * | 1/2006 | Wilcock et al. | 709/204 |
| 7,082,409 B1 * | 7/2006 | Cherry | 705/27.1 |
| 7,159,116 B2 * | 1/2007 | Moskowitz | 713/176 |
| 7,277,601 B2 * | 10/2007 | Zorab et al. | 382/305 |
| 7,325,143 B2 * | 1/2008 | Wettstein | 713/185 |
| 7,458,082 B1 * | 11/2008 | Slaughter et al. | 719/328 |
| 2002/0004831 A1 | 1/2002 | Woodhill | |
| 2002/0007345 A1 | 1/2002 | Harris | |
| 2002/0056747 A1 * | 5/2002 | Matsuyama et al. | 235/382 |
| 2002/0111919 A1 | 8/2002 | Weller et al. | |
| 2002/0147691 A1 * | 10/2002 | Davis et al. | 705/64 |
| 2002/0194138 A1 | 12/2002 | Dominguez et al. | |
| 2003/0023541 A1 | 1/2003 | Black et al. | |
| 2003/0042301 A1 * | 3/2003 | Rajasekaran et al. | 235/380 |
| 2003/0061163 A1 | 3/2003 | Durfield | |

FOREIGN PATENT DOCUMENTS

| | | | |
|---|---|---|---|
| EP | 1189186 | 3/2002 | G07F 19/00 |
| GB | 2383497 | 12/2001 | H04Q 7/38 |
| JP | 05-061834 | 3/1993 | |
| JP | 09-127976 | 5/1997 | |
| JP | 2000-067005 | 3/2000 | |
| JP | 2001-052181 | 2/2001 | |
| WO | WO 9843169 A2 * | 10/1998 | G06F 12/14 |
| WO | WO99/60483 | 11/1999 | G06F 12/14 |
| WO | WO99/64956 | 12/1999 | |
| WO | WO00/62214 | 10/2000 | |
| WO | WO01/01280 | 1/2001 | |
| WO | WO01/15379 | 3/2001 | |
| WO | WO01/18718 | 3/2001 | |
| WO | WO-0118718 A1 | 3/2001 | |
| WO | WO01/33520 | 5/2001 | |
| WO | WO-0133520 A1 | 5/2001 | |
| WO | WO01/41013 | 6/2001 | |
| WO | WO01/44940 | 6/2001 | |
| WO | WO01/44977 | 6/2001 | |
| WO | WO-0141013 A1 | 6/2001 | |
| WO | WO-0144940 A1 | 6/2001 | |
| WO | WO-0144975 A2 | 6/2001 | |
| WO | WO01/57609 | 8/2001 | |
| WO | WO-0157609 A2 | 8/2001 | |
| WO | WO01/69549 | 9/2001 | |
| WO | WO01/69556 | 9/2001 | |
| WO | WO01/78493 | 10/2001 | |
| WO | WO01/82246 | 11/2001 | |
| WO | WO01/99071 | 12/2001 | |
| WO | WO01/99378 | 12/2001 | |
| WO | WO02/05224 | 1/2002 | |
| WO | WO02/05232 | 1/2002 | |
| WO | WO02/08853 | 1/2002 | |
| WO | WO-0205224 A2 | 1/2002 | |
| WO | WO-0208853 A2 | 1/2002 | |
| WO | WO02/27610 | 4/2002 | |
| WO | WO02/27631 | 4/2002 | |
| WO | WO02/073364 | 9/2002 | |
| WO | WO02/084456 | 10/2002 | |
| WO | WO02/099720 | 12/2002 | |
| WO | WO03/017049 | 2/2003 | |
| WO | WO03/042893 | 5/2003 | |

OTHER PUBLICATIONS

"Israeli Application Serial No. 161437, Office Action mailed Aug. 24, 2008", 14 pgs.
"Chinese Application Serial No. 02820538.3, Office Action mailed Jun. 5, 2009", 4 pgs.
"European Application Serial No. 02778554.2, Office Action mailed Mar. 27, 2009", 5 pgs.
"Japanese Application Serial No. 2003-537232, Office Action mailed Jun. 30, 2009", 8 pgs.
"Israeli Application Serial No. 161437, Office Action Mailed Nov. 9, 2009", 1 pg.
"Japanese Application Serial No. 2003-537232, Office Action mailed Dec. 3, 2008", 12 pgs.
"Australian Application Serial No. 2002340207, Response filed Jul. 15, 2008 to Office Action mailed Sep. 10, 2007", 11 pgs.
"Canadian Application Serial No. 2,463,891, Office Action mailed Dec. 3, 2010", 2 pgs.
"European Application Serial No. 02778554.2, Response filed Oct. 13, 2009 to Office Action mailed Mar. 27, 2009", 17 pgs.
"Filipino Application Serial No. 1-2004-500553, Notice of Allowance mailed May 28, 2008", 1 pgs.
"Filipino Application Serial No. 1-2004-500553, Response filed May 16, 2008 to Office Action mailed Mar. 19, 2008", 15 pgs.
"Indian Application Serial No. 787CHENP/2004, Office Action mailed Apr. 19, 2006", 2 pgs.
"Indian Application Serial No. 787CHENP/2004, Response filed Apr. 9, 2007 to Office Action mailed Apr. 19, 2006", 10 pgs.
"Israeli Application Serial No. 161437, Office Action mailed May 14, 2009", 1 pgs.
"Israeli Application Serial No. 161437, Response filed Feb. 17, 2010 to Office Action mailed Oct. 19, 2009", 15 pgs.
"Israeli Application Serial No. 161437, Response filed Mar. 26, 2009 to Office Action mailed Jan. 29, 2009", 6 pgs.
"Israeli Application Serial No. 161437, Response filed Aug. 24, 2009 to Office Action mailed May 14, 2009", 41 pgs.
"Israeli Application Serial No. 161437, Response filed Dec. 4, 2008 to Office Action mailed Aug. 24, 2008", 15 pgs.
"Japanese Application Serial No. 2003-537232, Response filed Jun. 2, 2009 to Office Action mailed Dec. 3, 2008", 52 pgs.
"Canadian Application No. 2,463,891—Office Action Response", May 19, 2011, 22 pgs.

* cited by examiner

VERIFICATION OF A PERSON IDENTIFIER RECEIVED ONLINE

FIELD OF THE INVENTION

The present invention relates to a method and system for verifying a person identifier received in an online communication, and specifically for the purpose of recognizing legitimate online commercial transactions.

BACKGROUND OF THE INVENTION

Many online services require collection of identifying information (person identifiers) about their users. This information usually includes items such as a credit card number for charging an account, a name and address for shipping merchandise, a phone number for contacting the user etc.

For various reasons, the major channel for collecting such information is by requesting users to manually enter such information, usually in an online form, such as an HTML form. Since this method relies completely on the good will of the user, it is very susceptible to fraud and manual errors. There is no common way to distinguish an authentic user from a malevolent user who gained access to such information. For example, anyone gaining access to a person's credit card details can conduct a transaction on his behalf by entering these details in an online purchase form.

Because of this limitation online credit card fraud is inflated in no proportion to the real world, and online commerce is not as common and accessible as it could be.

Several methods have been proposed to overcome this limitation. Some of them involved requiring users to identify themselves offline prior to conducting a transaction. One such system is the SET project launched by Visa, MasterCard and other parties. It was based on banks issuing digital certificates to their cardholders offline, installing these certificates on buyers' computers and verifying them during a transaction. In practice, the distribution of certificates to millions of prospective buyers proved to be too complicated and costly, and SET failed.

Visa has recently launched a similar initiative called '3-Domain Secure' or '3D Secure' (marketed in the USA as 'Verified by Visa'), which is similar to SET, but allows issuing banks to authenticate their cardholders online with a password. This password is usually assigned online after some proof of identification is given (e.g. a secret code printed on the credit card statements sent to the cardholder's home). This system significantly simplifies the registration of buyers, but still requires a huge effort. 3D Secure is described in PCT Application WO01/82246.

Another method of preventing fraud is based on pattern recognition and artificial intelligence. Several products, like "Falcon Fraud Manager for Merchants" (formerly eFalcon) from HNC Software (aspects of which are described in U.S. Pat. No. 5,819,226, and in "Falcon Fraud Manager for Merchants White Paper" available on request from HNC), and Internet Fraud Screen from Cybersource, try to detect parameters typical to a fraudulent transaction. Such parameters may include shipping to an international POB address, frequent purchases on the same card etc. While these systems can reduce fraud to some extent, they offer only a partial solution and may cause legitimate transactions to be rejected (this type of error is known as a 'False Positive'). This is a result of the small amount of definitive information available in an online transaction, thus limiting the effectiveness of such analyses. Many inventions in this field can be found, such as PCT Application WO01/33520, U.S. Pat. No. 6,029,154, U.S. Pat. No. 6,254,000, U.S. Pat. No. 6,095,413 and PCT Application WO01/18718.

Another popular method is the Address Verification Service (AVS) operated by credit card issuers. This service compares an address provided by a buyer to the address used by the issuer to send periodic bills and associated with the credit card number provided by the buyer. A match is supposed to indicate a lower likelihood of fraud. This method is limited in that gaining access to a buyer's address is usually not difficult. A merchant can choose to ship a product only to a verified address, but it then limits its service.

Companies that already hold reliable non-public personal information about a user may verify the user's identity by presenting him with questions regarding that information in an online environment. For example, in accordance with U.S. Pat. No. 6,263,447 of Equifax, a credit bureau may ask a user for information about the status of loans given to the person he is claiming to be. PCT Application WO01/41013 describes an application of such a method in an online auction environment.

Authentify, Inc. from Chicago, Ill. offers a method for verifying a phone number provided online. According to this method, described in PCT Application WO01/44940, a user provides his phone number online and receives a secret code. A phone call is then made to the phone number, and the user should provide the secret code in that phone call. This verifies the user has access to the phone line identified by that phone number. This method is limited in that it requires making a phone call. It is further limited in that it can only verify phone numbers.

PayPal, Inc. from Palo Alto, Calif. uses another method of authenticating Internet users. This method, described in PCT Application WO02/05224, is based on submitting a credit card transaction in which the merchant's name field includes a secret code. The user should type this code online upon seeing the charge on his bill (either by viewing it online or in paper). By doing so PayPal verifies that the user has access to the bill, and not only the credit card details. This method is limited in that users need to actively check their credit card accounts for the secret code, and then manually provide it online. It is further limited in that the authentication process normally takes a few days or weeks. It is further limited in that it can only verify chargeable account identifiers.

Another method for authenticating Internet users is described in patent applications WO02/08853 and WO01/57609. This method is based on cooperation with network access providers (NAP). NAPs hold identifying information about users, and assign them network addresses. They can therefore verify a user's identifying information given his network address. This method is limited in that verifying a person identifier requires cooperation with the person's NAP. This limitation is especially significant in the Internet, where each user has a single NAP (his Internet Service Provider), and the total number of NAPs is large.

There is an apparent need for a method that could accurately verify the authenticity of person identifiers received online in real time and without requiring active user participation or carrying unreasonable deployment requirements.

BRIEF SUMMARY OF THE INVENTION

According to the present invention, there is provided a method of verifying a first person identifier (PI) comprising of receiving a Verification Request including the first person identifier; and estimating whether Verification Conditions including: (a) PI1 and a second person identifier (PI2) satisfy a Same Person Condition, (b) a sender of PI1 and a sender of PI2 satisfy a Same Sender Condition, and (c) PI2 identifies the sender of PI2; are true.

Preferably, the method also includes the step of sending a Verification Report, based on the results of the estimating, that indicates whether PI1 identifies its sender.

Preferably, the Verification Request also includes at least one of: (a) PI2; (b) a first sender indicator relating to PI1; (c) a second sender indicator relating to PI2; and (d) verification Information for PI2.

Preferably, the estimating further includes: (a) sending at least one query to at least one Person Identifier-Sender Indicator Database; and (b) receiving at least one response to the query.

Preferably, the query is a conditional query describing at least one of the Verification Conditions.

Preferably, the estimating further includes estimating whether the response to the query satisfies at least one of the Verification Conditions other than the Verification Condition that was described in the query.

Preferably, the Same Person Condition is satisfied if PI1 and PI2 have a Same Person Relation that includes at least one of the relations: (a) the two person identifiers include identical portions; (b) the two person identifiers include portions that are identical except for spelling differences; (c) one of the two person identifiers includes an abbreviation of a second of the two person identifiers; (d) the two person identifiers include numerically close phone numbers; (e) the two person identifiers include geographically close geographical parameters; (f) a directory record associates a person identifier that has a Same Person Relation with one of the two person identifiers with another person identifier that has a Same Person Relation with a second of the two person identifiers; and (g) each of the two person identifiers has a respective Same Person Relation with a third person identifier.

Preferably, the Same Sender Condition is satisfied if a message containing PI1 and a message containing PI2 have a Same Sender Relation that includes at least one of the relations between a first message and a second message: (a) membership of the first and second message in a common integral message; (b) a relation between the time the first message was sent and the time the second message was sent; (c) a relation between a reliable network address of the sender of the first message and a reliable network address of the sender of the second message; (d) a first secret contained in the first message and a second secret contained in the second message are derivatives of the same secret; (e) a first secret that was sent to the sender of the first message and a second secret contained in the second message are derivatives of the same secret; and (f) each of the messages having a respective Same Sender Relation with a third message.

Preferably, the relation between the reliable network addresses is one of the relations: (a) identity of the reliable network addresses; (b) membership in the same sub-network of the reliable network addresses; (c) use of the reliable network addresses by the same organization; (d) use of the reliable network addresses by two related organizations; (e) use of the reliable network addresses by the same Internet Service Provider; (f) use of the reliable network addresses by the same Internet Service Provider Point of Presence; and (g) association of the reliable network addresses with close geographical locations.

Preferably, at lease one of the reliable network addresses is one of: An IP address, an IP address together with a UDP port number, a TCP session handle, and a physical interface identifier.

Preferably, at least one of the secrets is one of: A secret kept by a device, a secret HTTP cookie, a secret HTTP secure cookie, an SMTP header, an HTTP header, a hardware identifier, a secret kept in a software component installed on the device, a secret assigned to a person for online use, a username and password, a secret URL, a network address, an IP address, a UDP port number, and a TCP session handle.

Preferably, PI2 is considered to identify its sender if at least one of the following is true: (a) PI2 was verified using a standard method for verification of a person identifier; (b) PI2 was verified by performing a successful offline action based on PI2; (c) PI2 was verified by successfully charging an account; (d) PI2 was verified by receiving online a code sent to a mailing address; (e) PI2 was verified by receiving online a code sent in a phone call; (f) PI2 was verified by receiving, during a phone call, a code sent online; (g) PI2 was received in conditions atypical of fraud; (h) PI2 was sent a considerable period of time before or after PI1 was sent; (i) PI2 was sent to a service that fraudsters lack incentive to defraud; (j) PI2 is associated with significant online activity typical of legitimate users; (k) PI2 was provided by a trustable authorized agent of the sender of PI2; and (l) PI2 was verified using the present invention.

Preferably, the estimating is effected using at least one of the methods: (a) rule-based logic; (b) an automatic learning technology; (c) a neural network; and (d) probabilistic analysis.

Preferably, the Verification Report includes at least one of: (a) a positive response; (b) a negative response; (c) PI2; (d) a sender indicator relating to PI2; (e) verification Information of PI2; (f) a score describing the probability that PI1 and PI2 satisfy a Same Person Condition; (g) a score describing the probability that the sender of PI1 and the sender of PI2 satisfy a Same Sender Condition; (i) a score describing the probability that PI2 identifies the sender of PI2; and (j) a score describing the probability that PI1 identifies the sender of PI1.

Preferably, the score describing the probability that PI1 identifies the sender of PI1 is based on at least one of the parameters: (a) a probability that PI1 and PI2 satisfy a Same Person Condition; (b) a probability that the sender of PI1 and the sender of PI2 satisfy a Same Person Condition; (c) a probability that PI2 identifies the sender of PI2; (d) difficulty in gaining access to a secret upon which the Same Sender Condition is based; (e) reliability of an address of the sender of PI1; (f) reliability of an address of the sender of PI2; (g) accuracy and reliability of external data sources used in the step of estimating; (h) popularity of PI1; (i) popularity of PI2; (j) tendency of people to change a person identifier; (k) time elapsed between sending of PI1 and sending of PI2; and (l) time elapsed since charging an account identified by PI2.

Preferably, the estimating also includes: (a) sending at least one query to at least one Person Identifier Directory; and (b) receiving at least one response to the query.

Preferably, the method also includes the step of generating a hash of a part of at least one of the following information elements: (a) PI1; (b) PI2; (c) a first sender indicator relating to PI1; and (d) a second sender indicator relating to PI2.

Preferably, the method also includes the step of determining the size of the hash, based on at least one of the considerations: (a) information confidentiality; and (b) an acceptable level of false verifications.

Preferably, the entity receiving PI1 from its sender is different than the entity receiving PI2 from its sender.

Preferably, the step of estimating is repeated with at least one person identifier other than PI2.

Preferably, the method also includes the step of choosing which person identifier from a plurality of person identifiers to use as PI2 in the step of estimating.

Preferably, the method also includes the step of obtaining at least one sender indicator from the sender of PI1.

Preferably, the method also includes the step of combining results of the estimating with results of at least one other method of verifying a person identifier.

Preferably, PI1 or PI2 include one of: a full name, a first name, a middle name, a last name, name initials, a title, an address, a country, a state, a city, a street address, an apartment number, a zip code, a phone number, an email address, a financial account number, a credit card number, a bank account number, a government-issued identifier, a social security number, a driver's license number, a national ID number, a passport number, personal characteristics, a height, a weight, a gender, a complexion, a race, and a hair color.

Preferably, PI1 is sent via one of: an Internet, a private data network, a CATV data network and a mobile data network.

According to the present invention, there is provided a system comprising: (a) a Receiver for receiving a Verification Request including PI1; and (b) a Verification Estimator for estimating whether PI1 and a PI2 satisfy a Same Person Condition, for estimating whether a sender of PI1 and a sender of PI2 satisfy a Same Sender Condition, and for estimating whether PI2 identifies the sender of PI2.

Preferably, the system also comprises a reporter for sending a Verification Report, based on output of the Verification Estimator, indicating whether PI1 identifies the sender of PI1.

Preferably, the system also includes a Person Identifier Directory Query Module for sending a query to a Person Identifier Directory and receiving a response to the query, the response then used by the Verification Estimator.

Preferably, the system also includes at least one Person Identifier Directory.

Preferably, the system also includes a Person Identifier-Sender Indicator Database Query Module for sending a query to at least one Person Identifier-Sender Indicator Database and receiving a response to the query, the response then used by the Verification Estimator.

Preferably, the system also includes at least one Person Identifier-Sender Indicator Database.

Preferably, the system also includes a Hash Generator for generating a hash of at least one of: (a) PI1; (b) PI2; (c) a first sender indicator relating to PI1; and (d) a second sender indicator relating to PI2.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention has several advantages over the prior art. One advantage is that the system and method does not usually require any active participation from the users such as software or hardware installation, registration, entering a password etc. Another advantage is that the system and method does not usually rely on cooperation of one specific entity to verify a person identifier. Another advantage is that it is relatively difficult to defraud the system and method, as it usually relies on secrets kept at the user's device to verify his identifying information, which are not easily accessible to unauthorized parties.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The inventors have developed a method for verifying a person identifier received in an online communication, achieved through the analysis of another person identifier received in an online communication.

GLOSSARY OF ACRONYMS

Figure 1:
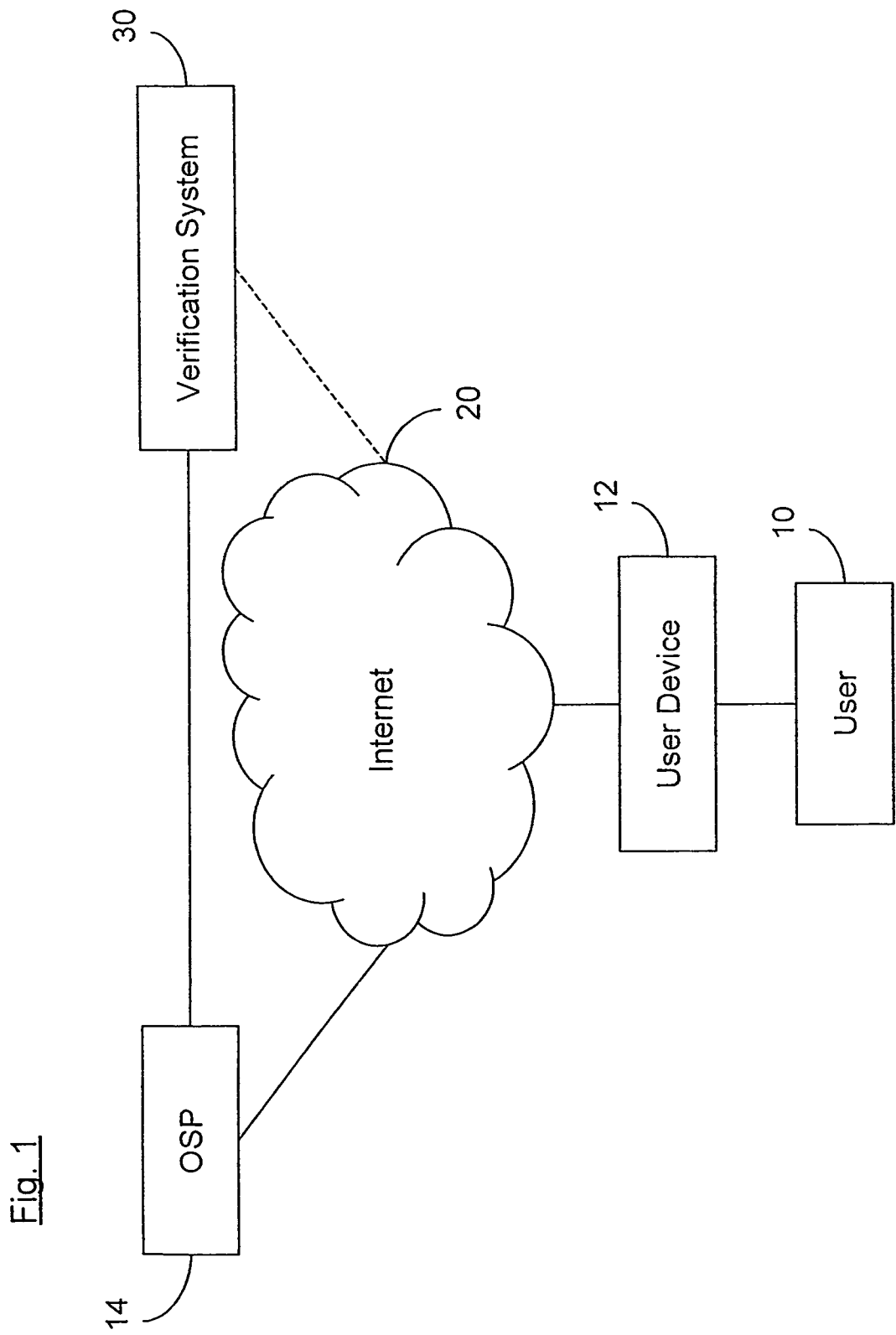
FIG. 1 describes the environment in which the system operates.

The following acronyms are used in the document:
AVS—Address Verification Service
CATV—Cable Television
CPU—Central Processing Unit
DNS—Domain Name System
FPS—Fraud Prediction Service
FTP—File Transfer Protocol
FVW—Frequently Visited Website
HTML—Hypertext Markup Language
HTTP—Hypertext Transfer Protocol
HTTPS—HTTP Secure
IMC—Instant Messaging Client
IMC—Instant Messaging Service
ISN—Initial Sequence Number
ISP—Internet Service Provider
MAC—Media Access Control
MIME—Multi-purpose Internet Mail Extensions
NAPT—Network Address Port Translation
OBPS—Online Bill Presentment System
OSP—Online Service Provider
PI—Person Identifier
PI2VI—PI2 Verification Information
PISIDB—PI-SI Database
POP—Point of Presence
PTC—PI2 is True Condition
RFC—Request for Comments
SI—Sender Indicator
SMTP—Simple Mail Transfer Protocol
SPC—Same Person Condition
SPR—Same Person Relation
SSC—Same Sender Condition
SSN—Social Security Number
SSO—Single Sign-On service
SSR—Same Sender Relation
TCP—Transmission Control Protocol
TLS—Transport Layer Security
UDP—User Datagram Protocol
URL—Uniform Resource Locators
WBES—Web Based Email Service Environment FIG. 1 describes the environment in which the system operates. A User 10 is connected to the Internet 20 using a User Device 12. Normally, many other users are also connected to Internet 20. User 10 is a person using User Device 10 to send and receive messages over Internet 20. In the context of the present invention, the term person may also refer to a device capable of generating messages for sending and/or processing incoming messages. Examples of types of User Device 12 are a PC with a modem and browser, an interactive TV terminal and a cellular phone with a microbrowser. An Online Service Provider 14 (OSP) is also connected to the Internet 20 and serving User 10. OSP 14 can be any entity that requires verification of user information, for example an electronic commerce service such as an online merchant, an auctions site, an online bank, an online credit card issuer, or a payment service provider.

Verification System 30 is the system carrying out the present invention and is accessible to OSP 14. It may also be connected to the Internet 20. As used herein, the term "Internet" also refers to any other data network over which a User and OSP may communicate.

Information Relations

Information Elements and Entities

Figure 2:
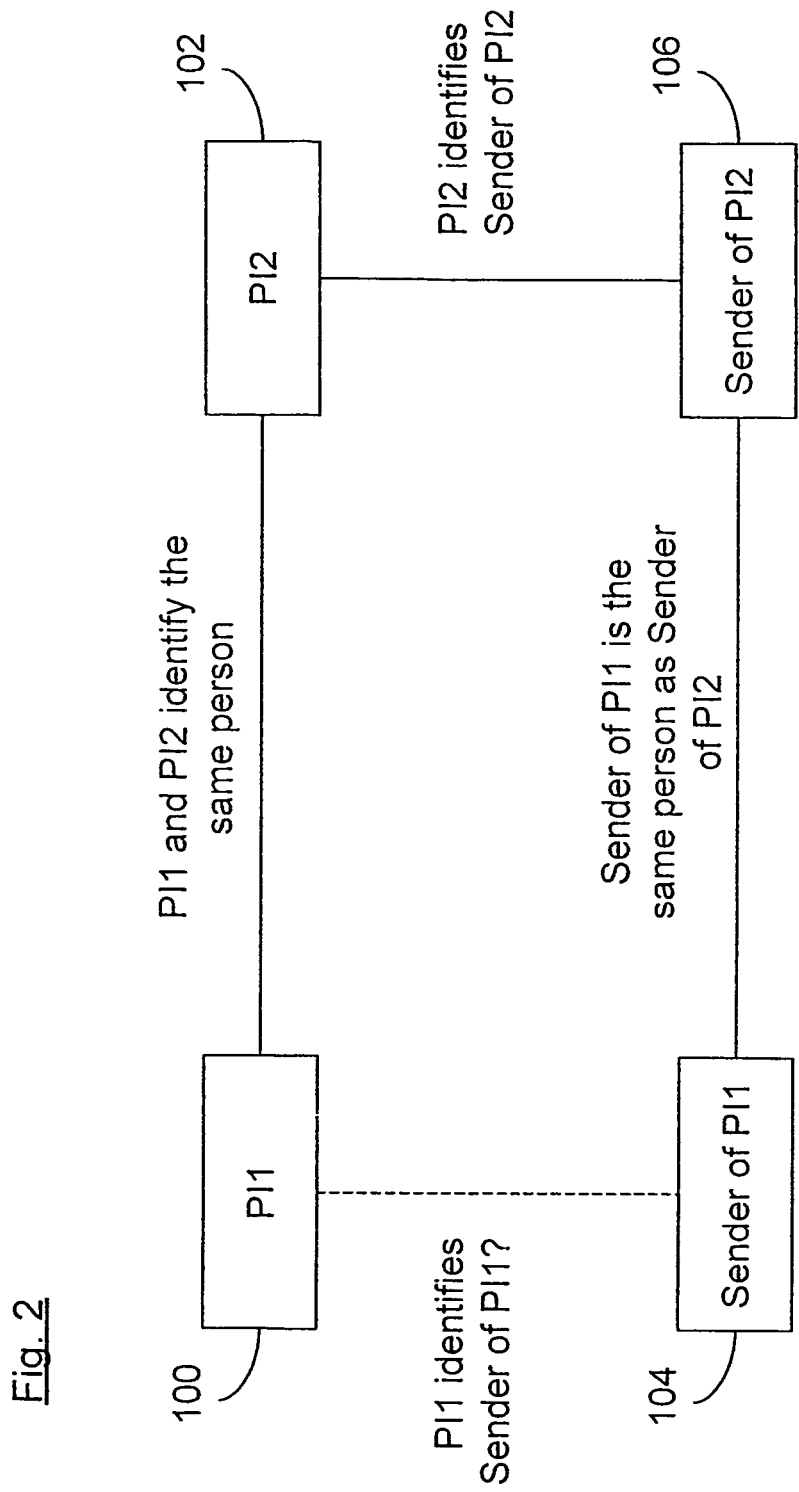
FIG. 2 describes the relations between information elements and entities that enable the verification of a person identifier.

FIG. 2 describes the relations between information elements and entities that enable the verification of a person identifier, in accordance with the present invention.

PI1 100 is a Person Identifier sent by Sender of PI1 104, and received by OSP 14. A Person Identifier (PI) is an information element or a set of information elements describing some persons more than others. For example, a name (first, middle, last, initials, titles etc.), an address (country, state, city, street address, apartment number, zip code etc.), a phone number, a financial account number (credit card number, bank account number etc.), a government-issued identifier (social security number, driver's license number, national ID number, passport number etc.), a personal characteristic (height, weight, gender, complexion, race, hair color etc.), and any combination thereof. A PI can further be any information element that is associated with a PI through a PI Directory, as described below.

OSP 14 wishes to verify PI1 100. PI Verification is the process of estimating whether a PI is true or false. A true PI is a PI that identifies (i.e. describes) its sender, and a false PI is a PI that does not identify its sender.

PI1 100 may require verification if OSP 14 suspects that PI1 100 was sent by a fraudster attempting to impersonate a person identified by PI1 100, or if OSP 14 suspects PI1 100 contains unintentional errors. For simplicity reasons, only the possibility of fraud is discussed below. Extension to the case of unintentional errors is obvious to a person skilled in the art.

For example, PI1 100 may require verification if it was provided in the context of an online purchase process, registration to an online banking service, online application for a credit card etc.

PI2 102 is another PI sent by Sender of PI2 106. It may have been received by OSP 14 or by another online service provider. PI2 102 is normally received before PI1 100, but can also be received after PI1 100.

For example, PI2 102 may have been received during an online purchase process, software installation, registration for an online service etc.

Sender of PI1 104 is User 10, and Sender of PI2 106 may or may not be User 10, as described below.

In some cases, the actual process of sending PI1 100 or PI2 102 may be done not by Sender of PI1 104 and Sender of PI2 106 directly, but rather by an authorized agent thereof. For example, a parent may provide his child's details to an online service in order to register the child to the service. In another example, a system administrator at a company may provide the details of a new employee to the company's email server in order to allow the employee to receive email. In such cases, we consider the sender to be the person whose PI is provided and not the person technically sending the PI, as long as the latter is indeed authorized to provide that PI.

Verification Conditions

The present invention verifies PI1 100 by checking that:
1. PI1 100 and PI2 102 identify the same person (Same Person Condition—SPC).
2. Sender of PI1 104 is the same person as Sender of PI2 106 (Same Sender Condition—SSC).
3. PI2 102 identifies Sender of PI2 106 (PI2 is True Condition—PTC).

When these conditions ('Verification Conditions') are satisfied, PI1 100 is shown to identify the same person as PI2 102, which identifies Sender of PI2 106, who is the same person as Sender of PI1 104. Therefore, PI1 100 identifies Sender of PI1 104, which means PI1 100 is true.

Satisfying the Verification Conditions should be a more difficult task for a fraudster providing another person's person identifier, than for someone providing his own person identifier. The Verification Conditions should therefore be defined in a way that presents maximal difficulties to fraudsters and minimal difficulties to ordinary people, as described in detail below.

The strength of a Verification Condition is defined as the probability that it is true. It therefore depends on the difficulty for a fraudster to successfully satisfy that Verification Condition in the way it was satisfied.

Same Sender Condition

Definition

A successful verification requires that Sender of PI1 104 be the same person as Sender of PI2 106. This is the Same Sender Condition (SSC). SSC is satisfied if a message containing PI1 100 and a message containing PI2 102 have a Same Sender Relation (SSR). In this context, we define a message as information sent over a communication medium. Several methods exist for examining whether two messages have an SSR.

Integral Message—One method is based on the two messages being part of one integral message that is known (or assumed) to have one sender. An integral message is a message that cannot be changed in transit (or that it is relatively difficult to change in transit). For example, in a packet switched network, a fraudster would need access to network appliances on the route of a packet in order to change it in transit, which is usually difficult. Therefore, all information in one packet is considered to be from the same sender. Another example of an integral message is information that is signed using a cryptographic method for maintaining message integrity (e.g. HMAC algorithm described in RFC 2104, or RSA signature described in U.S. Pat. No. 4,405,829).

In this case, the strength of the SSR (which determines the strength of the SSC) mostly depends on the difficulty in changing the integral message in transit.

Another method is examination of the relation between two information elements, each related to each of the two messages. Any such information element that can be used to determine whether the two messages were sent from the same sender is called a Sender Indicator (SI). An SI can be received in the message (e.g. as part of the same integral message) or outside the message (e.g. describe how the message was received: from what physical connection, at what time etc.). An SI related to the message containing PI1 100 is named SI1, and an SI related to the message containing PI2 102, is named SI2.

Same Secret—In one example of examination of SIs, two messages are considered to be from the same sender if each contains the same secret. A secret is an information element that is not easily accessible to the public (and especially not to fraudsters). In this case, the SIs are the two appearances of the same secret (or derivatives of it, as described below), and the strength of the SSR mostly depends on the difficulty in gaining access to the secret (e.g. by eavesdropping, by gaining access to the sender's device, by guessing it etc).

It should be noted, that it is also possible that a derivative of the same secret appear in one of the two messages or in both, instead of the secret itself, as long as the derivative is not easily accessible to the public (without knowing the secret). In one example, a derivative is present instead of the secret because it is also used for another purpose, such as a sequence number in TCP (described below). In another example, the source encrypts the secret before sending it in the second communication to strengthen this method against eavesdropping—a fraudster eavesdropping to the first communication would not be able to create the derivative because he does not have the encryption key. In this example an implementation of this method would need the encryption key to verify the derivative.

For simplicity purposes, the term 'derivative of a secret' can also refer to the secret itself.

Reliable Address—In another example, two messages have an SSR if a reliable network address of the sender is provided for each message, and the two addresses are more likely to be used by the same sender than two random addresses. An address is considered reliable if a fraudster cannot easily fabricate it. In this case, the SIs are the two reliable sender addresses, and the strength of the SSR mostly depends on the reliability of the addresses, and on the correlation between senders and addresses.

Assigned Secret—In another example, two messages are considered to be from the same sender if a secret was sent to the sender of the first message, and it (or a derivative of it) is received in the second message. Use of this method usually depends on achieving a 'Reliable Address', to make sure that the secret is sent to the real sender of the message (otherwise the secret may be compromised). In this case, one SI is the secret sent to the sender of the first message, and the other SI is the secret or derivative appearing in the second message. The strength of the SSR depends on the difficulty in gaining access to the secret. Since the secret is sent to an address, this difficulty also depends on the reliability of the address, and the possibility of eavesdropping on messages to that address.

It should be noted that the two messages are not necessarily received by the same entity. For example, in the 'Same Secret' method, two messages containing the same secret may be sent to two different entities. The two entities must cooperate in order to verify that the secrets match. For example, one entity will send the secret it received (or a derivative of it) to the second entity and the second entity compares it with the secret it received.

Some SIs relating to messages from the same sender may change over time (e.g. the network address of a user may change; the same secret may be assigned to different users at different times). In such cases the strength of the SSR depends on the time passed between sending of the two messages (shorter times leading to stronger relations), it may therefore be useful to know at what time each of the messages was sent (which is usually assumed from the time it was received).

PI1 100 and PI2 102 may have more than one SI related to each of them, and each SI1 may be used in combination with each SI2 for examining whether the two messages have an SSR. In addition, each pair of SI1 and SI2 may be related in more than one way. For example, SI1 and SI2 may have the 'Same Secret' relation and the 'Reliable Address' relation, as described below. Usually, the existence of each additional relation between an SI1 and an SI2 of a given PI1 100 and PI2 102 strengthens their SSR. The exact strength indicated by multiple relations depends on the level of correlation between them.

In general, if an SI is more common (i.e. contained in messages of more persons) SSR is weaker, as it increases the probability that messages from different persons will be considered to be from the same person.

A secret used as an SI should be somehow kept between uses. The secret is normally kept in User Device 12 or memorized by User 10.

Following are examples of implementations of these methods:

IP Address

Internet Protocol (IP; see RFC 791) datagrams (or packets) contain the IP address of the sender ('source address') in the 'Source Address' field of each datagram. A source address can be used as a secret because it is usually not trivial for a fraudster to discover the address of a person he's attempting to impersonate. Even though the sender has full control on this field, It can also be used as a 'Reliable Address', since some IP networks will deny the transmission of IP packets, which they suspect to be spoofed (i.e. packets whose source address was not assigned to their sender), making it difficult for a fraudster to transmit such packets. Since not all networks implement such measures, a source address is a relatively weak 'Reliable Address'.

The reliability of an IP address as a 'Reliable Address' can be significantly increased by performing a 'secret handshake'. A 'secret handshake' is the process of sending a secret to an address and receiving back that secret (or a derivative of it). In most IP environments, it is difficult to eavesdrop on a message sent to another user. Therefore, this process shows that the message in which the secret was sent back (and any message contained in an integral message with that secret) was sent by the user who used the IP address to which the secret was sent, at the time it was received by that user.

The strength of a relation between two IP addresses associated with two messages depends on the method by which IP addresses are assigned and used in the network. In the Internet, IP addresses are assigned to Internet Service Providers, companies and other institutions ('owners') that assign them to their users. Such assignments are usually temporary and their durations vary. In some cases an address is assigned and used by the same user for months or years, while in other cases it is used for a few minutes. Therefore, the same address may serve different users at different times. The same address may also serve several users at once, as is the case with multi-user computers, and with computers connected to the Internet using Network Address Port Translation (NAPT; see RFC 2663). An estimate of the number of users using the same address may be beneficial for analyzing the strength of the relation.

If the two IP addresses are identical and reliable, it is usually considered a strong relation. The exact strength of the relation (measured as the probability the two messages were sent by the same sender) depends on the time passed between sending of the two messages (shorter times leading to stronger relations), the period that IP address is assigned for (longer periods leading to stronger relations), the number of users simultaneously using that IP address etc. It is sometimes possible to achieve a good estimate of the period an IP address is normally assigned for by checking the owner of that IP address, as can be found by performing a reverse Domain Name System lookup (also called inverse DNS query; see RFC 1034 and RFC 1035) or a 'whois' lookup (see RFC 954 and RIPE of Amsterdam, The Netherlands document ripe-238). For example, an IP owned by a company is usually assigned for longer periods to its users (employees), than one owned by an Internet Service Provider (ISP) serving home users.

Another relation between IP addresses is based on the assumption that even when the user is assigned a different IP address, it is assigned by the same entity. For example, a user will normally use the same ISP when connecting in different occasions, and an employee is likely to use the same company's network.

Therefore, two IP addresses used by the same ISP, by the same Point of Presence (POP) of the ISP, by the same organization, by two related organizations, or belonging to the same sub-network are more likely to indicate the same sender than two IP addresses that don't have any of these relations. IP addresses that are numerically close (specifically, if a significant number of their most-significant-bits are identical) also have this relation, as multiple IP addresses are normally assigned in one or more consecutive blocks.

Furthermore, it can also be assumed that even if the user connects through a different entity, the two entities will be located in close geographical locations (e.g. the ISP POP a user uses at home and the corporate network he uses at work). Some products are specifically suited for associating a geographical location with an IP address, such as EdgeScape from Akamai Technologies Inc. or NetLocator from InfoSplit Inc. Reverse DNS lookups and 'whois' lookups (described above) can also help in associating a geographical location with an IP address.

Naturally, a relation between IP addresses that considers a larger number of IP addresses as indicating the same sender causes the SSR to be weaker, since it presents a fraudster with more options for sending a message that will have an SSR with a message of his victim. For example, a relation in which IP addresses are identical is more difficult to compromise than one in which IP addresses have the same owner.

It should also be noted that the entity assigning an address to a user could assist in detecting the relation between IP addresses by assigning related IP addresses to the same user. For example, an ISP can identify a user using a username and password (often done using the Password Authentication Protocol or Challenge-Handshake Authentication Protocol described in RFC 1334) and then assign him an IP address, which is numerically close to the IP addresses assigned to him in the past. In another example, an organization's Dynamic Host Configuration Protocol (DHCP; see RFC 2131) server can identify a personal computer using its Ethernet Media Access Control address (MAC; as described in IEEE 802.11 standard), assign it an IP address and then update the organization's DNS server such that reverse DNS lookups on IP addresses assigned to that computer would yield related results (dynamic DNS updates are described in RFC 2136).

Physical Interface Identifier

In cases where several physical communication interfaces are used to receive messages, and messages from the same sender are normally received on the same interface (e.g. if each interface is connected to a different geographical area in the network), a physical interface identifier can be used as an SI indicating a 'Reliable Address'. It should be noted that the SI in this case is not included in the received messages but generated locally and associated with each message.

UDP Port Number

The User Datagram Protocol (UDP; see RFC 768) is often used for communicating over IP networks such as the Internet. UDP datagrams contain the UDP port number of the sender in the 'Source Port' field of each datagram. A UDP source port number can be used as a secret because it is usually not trivial for a fraudster to discover the port number used by a person he's attempting to impersonate. Normally, the UDP source port number is used in combination with the IP source address of the same datagram, because the meaning of the port number is in the context of a particular IP address.

TCP Session Handle

The Transmission Control Protocol (TCP; see RFC 793) is also often used for communicating over IP networks such as the Internet.

TCP implements the 'Assigned Secret', 'Same Secret' and 'Reliable Address' methods. It includes a secret handshake mechanism, in which each host stores a secret in the Initial Sequence Number (ISN) it sends to the other host during connection establishment, and then every TCP segment sent from the other host on that connection includes a derivative of the ISN in its Acknowledgement Number (ACKNUM field. Therefore, (a) all segments of a TCP session are considered to be from the same sender (they include a derivative of the same secret in an integral message), (b) the IP address of the sender is considered reliable (as it is verified with a secret handshake), and (c) all outgoing TCP segments are assumed to reach the sender of the incoming TCP segments (because the IP address used to send them is reliable).

It should be noted that different operating systems (and different versions of each) use different mechanisms for generating the ISN. Some of these mechanisms are stronger than others (i.e. the generated ISN is less predictable, and therefore a better secret). This affects the strength of the SSR.

A TCP session is identified by a 'TCP session handle' that includes a source IP, destination IP, source TCP port, and destination TCP port. This handle allows one host with one IP address to manage several TCP sessions concurrently. In cases where multiple users use the same IP address (e.g. NAPT), different users may have the same source IP but different TCP session handles. Therefore, responding to a message over a TCP session is more likely to reach only the message's sender, compared to responding in a raw IP packet to the source IP address of the message.

Protocols using TCP (e.g. Hypertext Transfer Protocol; HTTP; see RFC 2616) may aggregate messages from several senders into one TCP session (e.g. when an HTTP proxy handles request from several users to one HTTP server). In such cases each response received in the session must be matched with the relevant request. For example, an HTTP server is required to send its responses on a given TCP session in the same order it receives the requests.

Encryption Protocols

Encrypted communication protocols such as Transport Layer Security (TLS; see RFC 2246) implement the 'Same Secret' method. In this context, encryption is defined as a process of integrating a message with a secret. Therefore, two messages encrypted with the same (or related) encryption keys are considered to be from the same sender.

HTTP Cookie

The HTTP Cookie mechanism (described in U.S. Pat. No. 5,774,670 and in RFC 2109) allows a host receiving an HTTP request to cause the sender to send a specific information element (the cookie) on each subsequent request that meets certain conditions. A cookie can therefore be used as a mechanism for implementing the 'Same Secret' and 'Assigned Secret' methods. Specifically, when assigning a cookie containing a secret ('secret cookie') in an HT=P response, all subsequent HTTP requests containing the same secret cookie are considered to be from the same sender as the one that the secret cookie was sent to.

Some cookies (known as 'secure cookies') will only be transmitted if the communication channel over which the HTTP request is sent is secure, such as an HTTP Secure (HTTPS; see RFC 2818) connection. Secure cookies offer better security compared to regular cookies, because they are never transmitted in the clear, and are thus less vulnerable to eavesdropping. In addition, when using a secure communication channel the client will usually authenticate the identity of the server using a server certificate (for an explanation of certificates see RFC 2459), and so it will gain a very high confidence that the cookie is sent to the legitimate server.

Username and Password

Usernames and passwords are often used on the Internet to restrict access to certain services. They may be chosen by the user or assigned to him online. HTTP Basic Authentication Scheme (see RFC 2069) is a method of requesting and sending usernames and passwords in an HTTP session. A username and password can also be collected using an online form, such as a Hypertext Markup Language form (HTML; see RFC 1866). File Transfer Protocol (FTP; see RFC 959), Telnet (see RFC 854) and other services also contain mechanisms for collecting usernames and passwords.

A username and password can serve as an implementation of the 'Same Secret' and 'Assigned Secret' methods. Specifically, any message including the same username and password is considered to be from the same sender. If the username and password were assigned (and not chosen by the user), a message containing a username and password is considered to be from the same sender as the one the username and password were assigned to.

It should be noted that in many cases the use of usernames and passwords is automated. For example, it is common for an HTML browser to offer the user to store usernames and passwords and provide them automatically when they are requested.

Software Client

Some software clients installed on users' devices may report a unique identifier when communicating with an online service provider. This unique identifier allows the online service provider to identify the owner of the client in order to provide him with a personalized service. Such an identifier should be secret (to prevent impersonation), and therefore these clients can implement the 'Same Secret' and 'Assigned Secret' methods.

An example of such a popular software client is an Instant Messaging Client (IMC), such as ICQ, AOL Instant Messenger, MSN Messenger, and Yahoo! Messenger, which can be found at www.icq.com, www.aol.com/aim, messenger.msn.com and messenger.yahoo.com respectively. These IMCs report the unique identifier (which may be a username and password chosen by the user, a large random number assigned to the client etc.) whenever the user connects to the Instant Messaging Service (IMS).

Hardware Identifier

Hardware identifiers can be used as unique identifiers for software clients, for example when the software client requires the unique identifier to be associated with the device running it. Examples of hardware identifiers are a serial number of an Intel Pentium III processor (in accordance with Intel's patent application WO00/51036), and a globally unique Ethernet MAC address.

Some hardware identifiers may be reported without use of software and used for implementing the 'Same Secret' method, such as an Ethernet MAC address, which is normally sent with every Ethernet packet.

Secret URL

Uniform Resource Locators (URL; see RFC 1738) can also be used for implementing the 'Same Secret' and 'Assigned Secret' methods. For example, a user browsing an HTML site receives HTML pages that include URLs linking to other HTML pages, images, sound etc. The host providing these HTML pages can place a secret in each of these URLs ('Secret URLs'). Any HTTP request including such a secret URL is considered to be from the same sender as the one that the HTML page was sent to.

Secret URLs may also be used in the process of obtaining an SI, as described in detail below.

Email Headers

Email messages based on the Simple Mail Transfer Protocol (SMTP; see RFC 821) contain a number of SIs. Most of these SIs are items automatically provided by the user's email software, such as the sender's name and email address (in the SMTP "From:" header or the SMTP "MAIL FROM:" command), the sender's organization (in the SMTP "Organization:" header), the sender's device identifier (in the SMTP "HELO" command or the SMTP "Received:" header), the time and time zone on the sender's device (in the "Date:" header described in RFC 822), and the user's personal signature in the message's body (for simplicity purposes, the signature is also regarded as an 'Email header'). These SIs are generated once at the user's device (by the user or by the device), and then sent with all email messages. They therefore implement the 'Same Secret' method.

Many users manage their email accounts on a web based email service (WBES). WBES sites offer email services to users accessible over a Web interface (HTML over HTTP). Hotmail, owned by Microsoft (www.hotmail.com), and Yahoo Mail from Yahoo (mail.yahoo.com) are examples of two popular WBESs. In these cases, the SIs are stored on the server and not on the user's device.

It should be noted that most of these SIs are not strong secrets, as they are not very difficult to predict, and are exposed to all recipients of emails from the user.

Furthermore, many of the SIs are strongly related to PIs of the user, and should be handled accordingly, as described in detail below.

Another SI found in email messages is the user's IP address as obtained in the communication between the user's device and his email server and usually reported in the SMTP "Received:" header. This connection is usually in TCP (used in both SMTP and HTTP), and therefore the IP address is a 'Reliable Address'. However, since the IP address is usually reported by the user's email server (and not obtained directly from the user), the reliability of the address depends on the reliability of the user's email server.

HTTP Headers

Similar to email messages, HTTP requests contain a number of SIs that implement the 'Same Secret' method. For example, the type and version of the operating system and HTTP client are provided in the HTTP "User-Agent:" header; the types of files, encodings and languages accepted by the HTTP client are provided in the HTTP "Accept:", "Accept-Encoding:" and "Accept-Language:" headers.

The 'HTTP Validation Model' included in the HTTP standard, defines a number of headers that can be used for implementing the 'Same Secret' and 'Assigned Secret' methods. The contents of these headers are normally stored in the user's device (i.e. HTTP client) cache, and sent to the HTTP server with some requests. For example, when responding to requests of a given URL, an HTTP server may provide to each HTTP client a different timestamp in the 'Last-Modified:' header. The 'If-Modified-Since' headers included in subsequent requests for the same URL will then contain the client-specific time stamps sent by the server. In a similar example, the HTTP server may provide to each HTTP client a different entity tag in the 'ETag' header, and the clients will provide the entity tags in subsequent requests using the 'If-None-Match' header.

Message Timestamps

For various reasons, messages from the same sender are not distributed evenly in time (e.g. users do not send messages when they are asleep or not connected to a network). Furthermore, many senders' activity is periodical (e.g. every afternoon or every weekend). Therefore, messages sent at related times (e.g. within a short time frame, at similar hours of different days, at the same day of different weeks) are more likely to have been sent from the same sender.

SI Obtaining

In some cases, a special process is required in order to obtain a specific SI.

For example, cookies are sent only with HTTP requests to certain domains and URL paths. In order to obtain a cookie from a User Device 12 it must be caused to send an HTTP request to a specific domain and URL path. This is especially relevant when the present invention is invoked as a result of a message sent to one online service provider (OSPA), while the cookie to be obtained was issued by another online service provider (OSPB).

Since OSPA and OSPB will normally use different domain names, User Device 12 will not send the cookie with HTTP requests to OSPA. User Device 12 should therefore be caused to send an HTTP request to a hostname in OSPB's domain (e.g. si-obtainer.ospb.com) with the relevant path. This will cause the cookie to be sent. The component receiving this request is SI Obtainer 42, described below. While the hostname used to reveal the cookie is within OSPB's domain, SI Obtainer 42 is not necessarily controlled by OSPB—OSPB need only define a hostname in his domain that points to a hostname or IP address of SI Obtainer 42.

Usually OSPA would not know what domain and path are required to reveal a cookie of OSPB, while SI Obtainer 42 does have such information (e.g. because it is operated by a company that cooperates with OSPB). In this case, OSPA will cause the user's device to send an HTTP request to a well-known hostname (e.g. si-obtainer.com) pointing to SI Obtainer 42, while SI Obtainer 42 will cause the user's device to send an HTTP request to OSPB's domain, as described above.

If the cookie to be obtained is a secure cookie, the same procedure will be invoked, except that the user's device should be caused to send a secure request, for example by specifying the 'https' protocol identifier in the request URL. Furthermore, to allow the client to authenticate the identity of the server handling the request, a server certificate identifying the hostname under OSPB's domain will be issued to SI Obtainer 42, and this certificate will be presented to the client.

In another example, a username and password need to be obtained from a user or his device. In this case, a request to enter the username and password is sent to the user's device. This could be an authentication request of HTTP Basic Authentication or an online form for entering the username and password. This should cause a user to enter his username and password, or invoke an automatic mechanism that will provide these details. In order to invoke such an automatic mechanism, it may be necessary to cause the user's device to send an HTTP request to a specific URL and path, in a similar manner as with the case of obtaining a cookie.

In another example, a special process is required to obtain the IP address of the user's device. This may be necessary if communications from the user's device go through an HTTP proxy server or Network Address Translation (NAT; see RFC 2663). Methods for obtaining an IP address under these conditions are described in PCT application WO01/13289.

In another example, SIs are obtained by a software client provided to the user's device. Since software running on the user's device normally has higher privileges than online services, it may directly access SIs stored on the user's device (e.g. HTTP cookies, software identifiers, hardware identifiers, stored usernames and passwords etc.) and send them to SI Obtainer 42.

Some of the methods mentioned above required causing User Device 12 to send a particular request. One method of achieving this is by using the HTTP Redirection mechanism. Another method is to embed a link to a web object such as an image (also known as "web beacon") or a pop-up window in an HTML page sent to the user's device, such that it would send the required request in order to retrieve the web object. Client side scripting language such as JavaScript (for an explanation of JavaScript see the Netscape developers site at developer.netscape.com) may be used to create a pop-up window with no user intervention. Yet another method is to request a software client installed at User Device 12 to send the required request, for example through a proprietary protocol understood by this software client, or by invoking the software client through a MIME type associated with it (for an explanation of MIME types see RFC 2046).

The request exposing the SI must have an SSR with previous messages from the same user. This is required so parallel requests from different users will not be mixed, as well as to prevent fraudsters from sending requests and take over sessions of other users. This is normally done using the 'Assigned Secret' method and a secret URL.

If, for some reason, OSPA already causes users' devices to send a request for a service external to OSPA, such as an electronic wallet, a single sign-on service, a transaction authentication service, or an online advertising network, such service can be used in conjunction with any of the methods described above to cause the user's device to send any required request with minimal or no changes to OSPA. The benefit from using such an external service for this purpose is even greater when several online service providers cause users' devices to send a request to the same external service. Examples for electronic wallets and single sign-on services are Microsoft Passport, AOL Quick Checkout and Yahoo Wallet. An example of a transaction authentication service is '3D Secure'. An example of an online advertising network is 24/7 Real Media from New York, N.Y.

SSR Chaining

An SSR can also be based on a chain of SSRs. If message A has an SSR with message B, and message B has an SSR with message C, then message A and message C also have an SSR (since all three messages are shown to be from the same sender).

Naturally, the SSR between message A and message B can be of a different type than the SSR between message B and message C, and each can also be based on a different SI related to message B. For example, an IMC may send a unique identifier in a TCP session when connecting to an IMS (Message B), and Message A may have the same IP address as that of Message B (verified by the TCP 'secret handshake'), while Message C will contain the same unique identifier. In another example, the two SSRs are based on a 'Same Secret' relation with a secret URL and a secret cookie, both contained in the same HTTP request. In yet another example, one SSR is a 'Same Secret' with a secret cookie in an HTTP request, while another is based on having a related IP Address ('Reliable Address').

SSR chaining is especially useful when SIs relating to messages from the same user change over time. For example, the IP address an Internet user uses changes over time, as described above, such that the source IP addresses of two messages sent by the same user might only have a weak SSR, or no SSR at all. In such cases, other messages sent from the user may be used to find an SSR chain between the two messages. Some online service providers are more likely to receive such messages. One example is a frequently visited website (FVW), receiving HTTP requests from a large number of different users, each request containing an IP address and a secret cookie. Another example is an IMS, which receives a login message from users every time they connect to the Internet, wherein each login message contains an IP address and a unique identifier. Another example is an online service provider receiving emails from a large number of users, wherein each email contains an IP address and several secrets in email headers, as described above.

An SSR based on SSR chaining provides fraudsters with more possibilities for attacks (any of the links can be attacked) and is thus relatively weaker.

In one example of SSR chaining Message D is received in a HTTP request D from IP address D, and Message E is sent when an IMC connects to an IMS in TCP from IP address E. A reverse DNS query shows IP address D and IP address E were assigned to the same company.

The SSR chain in this case is as follows: (a) Message D was contained in HTTP request D (same HTTP request in one TCP session); (b) HTTP request D was sent from IP address D (the IP address appearing in the TCP session); (c) IP address D and IP address E were assigned to the same company ('Reliable Address'); and (d) Message E was sent to the IMS from IP address E (the IP address appearing in the TCP session).

Message D and Message E are thus considered to originate from the same sender.

In another example of SSR chaining, Message A is received in HTTP request A from IP address A. HTTP request B sent from IP address A, at a time close to the sending of message A, contains message B and a secret cookie, and received at an FVW. HTTP request C received at the FVW contains message C and the same secret cookie as HTTP request B.

The SSR chain in this case is as follows: (a) Message A was contained in HTTP request A (same HTTP request in one TCP session); (b) HTTP request A was sent from IP address A (the IP address appearing in the TCP session); (c) HTTP request A and HTTP request B both originate from IP address A and were sent at a similar time ('Reliable Address'); (d) HTTP request B and HTTP request C contain the same secret cookie ('Same Secret'); and (g) Message C was contained in HTTP request C (same HTTP request in one TCP session).

Message A and Message C are thus considered to originate from the same sender.

In another example of SSR chaining, Message F is received in HTTPS request F. In response to Message F a secure secret cookie was assigned limited to the domain "f.com". Message G is received in HTTP request G. In response to Message G, the user's device is redirected to a secret HTTPS URL in the domain "f.com", causing it to send the secret cookie.

The SSR chain in this case is as follows: (a) Message F was contained in HTTPS request F ('Integral Message' by cryptographic means); (b) the secure secret cookie sent with the secret HTTPS URL is the same cookie assigned in response to HTTPS request F ('Assigned Secret'); (c) the secret HTTPS URL is the same secret URL sent to the sender of HTTP request G ('Assigned Secret'); and (d) Message G was contained in HTTP request G (same HTTP request in one TCP session).

Message F and Message G are thus considered to originate from the same sender.

In another example of SSR chaining, Message H is received in HTTP request H from IP address H. Email message I was sent from IP address H at a time close to the sending of HTTP request H. Email message J was sent from IP address J, and has the same sender name, sender device identifier, time zone and personal signature as email message I. HTTP request K is sent from IP address J, at a time close to the sending of email message J and contains a secret cookie. HTTP request L contains message L as well as the same secret cookie as HTTP request K.

The SSR chain in this case is as follows: (a) Message H was contained in HTTP request H (same HTTP request in one TCP session); (b) HTTP request H was sent from IP address H (the IP address appearing in the TCP session); (c) HTTP request H and email message I both originate from IP address H and were sent at a similar time ('Reliable Address'); (d) Email message I and email message J have the same SIs, as described above ('Same Secret'); (e) HTTP request K and email message J both originate from IP address J and were sent at a similar time ('Reliable Address'); (f) HTTP request L and HTTP request K contain the same secret cookie ('Same Secret'); and (g) Message L was contained in HTTP request L (same HTTP request in one TCP session).

Message H and Message L are thus considered to originate from the same sender.

Same Person Condition

Definition

A successful verification requires that PI1 100 and PI2 102 identify the same person. This is the Same Person Condition (SPC). SPC is satisfied if PI1 100 and PI2 102 have a Same Person Relation (SPR). The SPR strength (which determines the strength of the SPC) varies and depends on several factors. In general, if PI1 100 and PI2 102 are less specific (i.e. relate to more persons) SPR is weaker, as it creates more cases in which different persons will be considered to be the same person. For example, PI2 102 may be the last 4 digits of a credit card number, and PI1 100 is a card number ending with those 4 digits. In this case, PI1 100 and PI2 102 are considered to identify the same person even though PI1 100 may actually be a different card number than the one from which PI2 102 was created. This allows a fraudster some flexibility in that he can use any card that matches the last 4 digits of PI2 102. As PI2 102 becomes less specific (e.g. contains less digits), it is easier to find a matching card, making the attack easier and the SPR weaker.

When estimating how specific PI1 100 or PI2 102 is, it may be beneficial to use a database describing the popularity of various person identifiers in the relevant population. For example, if PI2 102 contains a name, a description of the popularity of various names helps in estimating how specific PI2 102 is.

Persons may sometimes change some of their PIs (e.g. the street address of a person may change; the credit card number of a person may change). In such cases the strength of the SPR depends on the time passed between sending of the two PIs and on the tendency of people to change such PIs.

One method of estimating whether PI1 100 and PI2 102 identify the same person, is examining them for literal similarity by checking if they contain an identical portion. For example, PI1 100 and PI2 102 can be completely identical (e.g. the same full name). In another example, PI2 102 contains all or a part of PI1 100 (e.g. PI2 102 contains a credit card number, while PI1 100 contains the last 4 digits of that number). In another example, PI1 100 contains all or a part of PI2 102. In general, SPR is stronger if the identical portion of PI1 100 and PI2 102 is larger and more statistically significant.

In some cases, more complex processing is required to find a relation between PI1 100 and PI2 102 that indicate they have an SPR. For example, PI1 100 and PI2 102 may have an identical portion with reasonable spelling differences (e.g. 'Forty-Second St.' and '42nd street'). In another example PI1 100 may contain an abbreviation of PI2 102 or vice versa (e.g. the email 'jhdoe2002@mail.com' and the name 'John Henry Doe'). In another example PI1 100 and PI2 102 contain numerically close phone numbers (i.e. numbers that differ only by the last few digits such as 555-1280 and 555-1281), which are more likely to identify the same person than any two random numbers (since phone companies often assign consecutive phone numbers to the same customer). In another example, PI1 100 and PI2 102 contain geographically close geographical parameters, which are more likely to identify the same person than any two random geographical parameters, since a person is more likely to travel to nearby locations (e.g. a neighbor's house, a close by internet café, his workplace etc.) than to far locations. Examples of such parameters are consecutive house numbers within the same street or two latitude/longitude coordinates that are found to be close by geometrical calculations.

Using PI Directories

In some cases, use of a PI Directory is required to detect the SPR.

A PI Directory is a database containing records each associating two or more PIs, wherein there is at least one person that is identified by every PI in the same record. In this context, a database is any system or a combination of systems that can answer queries about the content of the records.

For example, each record in a white pages directory pertains to one person identified by a specific name, address and phone number.

Another example is a database of a credit card issuing bank in which each record pertains to one person identified by a name, credit card number, and billing address (the address to which the credit card bill is sent).

Another example is a geographical directory associating addresses with geographical parameters (e.g. latitude and longitude), or cellular phone numbers with the current geographical locations of the cellular phones.

Another example is an email directory associating each email address with the name of the person using that address. An email directory can be automatically created by analyzing email messages, as the address fields (From, To and CC) usually contain the recipient's or sender's name as well as his email address. In this case the email messages should be verified to be from a trusted source to prevent addition of erroneous or fraudulent records to the directory.

Other PI Directories may be less specific, such as one describing the correlation between names and countries (the popularity of certain names in certain countries). Each record in such a PI Directory could describe the number (or fraction) of people having a certain name in a certain country.

Some PI Directories associate PIs of the same type but from different times. For example, each record in a change-of-address database contains addresses of the same person (or family) at different periods in time.

Some PI Directories may have been created specifically for the purpose of online identification. For example, in the case described below where codes are sent to user's mail addresses, a PI Directory is created associating each code with the name and address it was sent to. In another example, the PayPal system described above uses a PI Directory associating each credit card number with the secret code used in charging that credit card.

It should be noted, that by associating an information element with a PI in a PI Directory, that information element becomes a PI. For example, when a government database is created assigning ID numbers to each citizen (e.g. identified by his full name, birth date and names of parents), each such ID number becomes a PI.

When using a PI Directory, PI1 100 and PI2 102 have an SPR if a record associates a PI that has an SPR with PI1 100 with another PI that has an SPR with PI2 102.

Access to PI Directories can be done in two methods: in the first method, some (but not all) PIs are given as a query for locating a relevant record (a record containing PIs that have an SPR with the PIs in the query) or records, and if found, the record or records are retrieved and sent in response. To minimize data transfer or preserve information confidentiality, it is also possible to limit the number of records sent in the response (e.g. only the most recent record), or the PIs sent from each record (e.g. not sending PIs that already appear in the query).

For example, if PI1 100 is a phone number, and PI2 102 is a full name and address, a query containing PI2 102 is sent to a white pages directory to find a record containing a PI that has an SPR with PI2 102 (e.g. the same name and address with spelling differences), and the response contains all the phone numbers associated with that name and address. The retrieved numbers are then checked for an SPR with PI1 100, as described above. In another white pages example, the query is a phone number and the response contains the associated names and addresses (generally known as a 'reverse phone lookup').

In the second method, at least two PIs are given as a query, and the response describes whether a relevant record exists, indicating whether a person identified by those PIs exists (or how many such persons exist). For example, if PI1 100 contains a credit card number, and PI2 102 contains an address, a query is sent to the AVS service described above containing both PI1 100 and PI2 102, and the response is a Yes/No answer describing whether a record exists in which a card number has an SPR with PI1 100 (i.e. identical to PI1 100) and an address has an SPR with PI2 102. Finding such a record usually indicates that PI2 102 is the billing address of the owner of the credit card account identified by PI1 100.

Of course, any combination of the two methods is also possible. For example, the query may include two PIs, and the response described whether such a record exists, and if so, includes a third PI from the same record.

In some cases, the response to the query is not provided explicitly but is rather implied from another action. For example, an online merchant submitting a transaction for processing may include address information, and the transaction will be authorized only if the address passes an AVS check. In this case, a successful transaction authorization indicates an AVS match.

In some cases, there is no explicit query to a PI Directory, but a response is received as a result of another action. For example, OSP 14 may receive an email from User 10 as part of an online purchase process. This email contains an association between the name and the email address of User 10, and is therefore equivalent to a response from an email directory.

It should be noted that access to a PI Directory could be done over any available platform. For example, a person may manually make a voice phone call to an issuing bank in order to verify a match between a credit card number and a cardholder's name.

It should be noted that use of a PI Directory could weaken the SPR between PI1 100 and PI2 102, especially when using a PI Directory that doesn't describe a one-to-one relation. Such directories increase the number of cases in which different persons will be identified as the same person. Specifically, when a PI of one type (e.g. an SSN) is replaced with a directory-associated PI of another type (e.g. the address of the person having that SSN), the identified group grows to all persons having a PI of the first type that is directory-associated with the second PI (e.g. all people living in the same address as that person), and they can not be told apart.

A PI Directory can also be used to find the total number (or fraction) of people that are identified by PI2 102, by PI1 100 or by both. These numbers can aid in estimating the strength of the SPR, as described above.

In one example, PI1 100 is a Social Security Number (SSN), and PI2 102 is a credit card number. A credit card issuer's database is used as a PI Directory associating credit card numbers with SSNs. The PI Directory can show that only one person exists with both that SSN and credit card number, indicating the card was issued to one person. This would usually indicate a strong SPR.

In another example, PI2 102 is an address of an apartment building, and PI1 100 is a full name. A white pages directory shows that one person by that name lives at that address. However, it also shows that several other persons live at that address. SPR is therefore not as strong as in the previous case.

In another example, PI2 102 is a first name, and PI1 100 is a country. A PI Directory describing name popularity in different countries shows a large number of persons have that name in that country, while a small number have that name outside that country. This indicates an SPR exists, but not as strong as in the previous cases.

It should also be noted that the accuracy and reliability of a PI Directory might also affect the strength of the SPR. The possibility of missing, outdated or erroneous records in the PI Directory should be considered when estimating the SPR.

SPR Chaining

An SPR can also be based on a chain of SPRs. If PI A has an SPR with PI B, and PI B has an SPR with PI C, then PI A and PI C also have an SPR (since all three PIs are shown to identify the same person). Each of the SPRs can be of a different type and may be based on a PI Directory.

For example, PI2 102 is a name, and PI1 100 is a credit card number. A white pages directory is used to find an address (or addresses) associated with that name. Next, the AVS service is used to verify that the address (or one of the addresses) is the billing address for the credit card number in PI2 102. This shows an SPR between the PI1 100 and PI2 102 that goes through a third PI (an address).

The use of SPR chaining or multiple PI Directories could further weaken the SPR (compared to the use of one PI Directory described above). In the last example, the relevant group is enlarged to any person having the same name as someone having the same address as any of the addresses associated with that card.

Furthermore, in estimating the SPR strength when using SPR chaining, only matching portions of the person identifiers are considered. For example, the PI 'john2002' contains a portion of the PI 'John Doe' which contains a portion of the PI 'bobdoe'. However, since the identical portions in each pair of PIs are completely different ('john' in the first pair, and 'doe' in the second pair) there is no evident SPR between 'john2002' and 'bobdoe'.

In cases where a response to a PI Directory query contains a large number of PIs that are used in another query (e.g. sent to another PI Directory or a PISIDB, as described below), additional PIs may be supplied by OSP 14, in order to narrow down the number of queries. In the AVS example given above, the user's address may be supplied along with his name. Instead of making an AVS query with all the addresses associated with the name in a white pages directory, one query is made to verify the name is associated with the supplied address, and an AVS query is made to verify the supplied address is associated with the card, PI2 is True Condition A successful verification requires that PI2 102 identify the Sender of PI2 106. This is the PI2 is True Condition (PTC). The probability that PI2 is true (termed PI2 Verification Level) varies and depends on several factors. Specifically, the method used for verifying that PI2 102 is true and its susceptibility to fraud are considered. Several such methods exist:

Existing Verification Methods

PI2 102 may be verified using any of the existing methods for verification of a person identifier. For example, PI2 102 is considered true if it contains information not usually accessible to fraudsters (e.g. a valid credit card number or bank account number) or if such information was provided with PI2 102 (such as a PIN matching the bank account number, or a correct response to the Equifax questionnaire described above).

Successful Offline Action

Another method of verifying PI2 102 is by performing a successful offline action based on PI2 102.

For example, if PI2 102 is a credit card number received during an online purchase, submitting a charge on the card for the purchased product and receiving no dispute, verifies PI2 102.

It should be noted that since disputes are not normally reported immediately, a significant period of time must pass after the charge before PI2 102 can be considered true (usually a few months).

Detecting whether a dispute occurred could be done by keeping track of disputed transactions and marking PI2 102 accordingly. Alternatively, the account can be checked to be valid after enough time has passed (e.g. by sending a credit card authorization transaction). Since accounts are normally blocked following unauthorized use, this ensures that no dispute was raised.

In another example of verification by an offline action, a unique secret code is sent to a mailing address, and the receiver is requested to submit the code online. The unique secret code identifies the user and is used as PI2 102 in the present invention. The party sending the code creates a PI Directory associating each code it sends with the address it was sent to. A communication in which the code is submitted identifies the sender and therefore verifies PI2 102. This usually indicates the sender is a resident at the address associated with the code in the PI Directory. Use of registered mail or other secure mail services can increase the strength of this method. The user can provide the code online manually (e.g. type it in a form), or the code may be contained in a computer-readable media and provided automatically.

In a similar manner, a code can be sent in a phone call to a specific phone number. A communication in which the code is provided back identifies its sender as having access to that phone number. The code can be provided over the phone in a voice communication or in a data communication session (e.g. using a modem).

Alternatively, the code is presented online in response to a communication containing a phone number (PI2 102). A user then provides the code in a phone call to (or known to be from) that number, as described in the Authentify system mentioned above. This will verify PI2 102 as long as the sender of the code is certain that the code was not also received by unauthorized persons.

Usage Patterns Atypical to Fraud

Another method for verifying PI2 102 is by analyzing whether the conditions in which it was received are atypical of fraud.

One such method is analyzing timestamps of when PI1 100 and PI2 102 were sent. Since online identity fraud attacks usually occur during a short period of time (e.g. the period between stealing a credit card and it being blocked), one can assume that if PI2 102 was sent a considerable period of time before or after PI1 100 was sent, and assuming the SPC and SSC are true, then PI2 102 is true (thereby verifying PI1 100 as well). Otherwise, it would indicate that a fraudster impersonated the same person twice over a long period of time, which is atypical (i.e. could indicate that he knew the identity of his victim in advance or that he waited a considerable period of time between obtaining the information and using it to perpetrate fraud etc). Therefore, a 'considerable time' would be a period of time significantly longer than a typical fraud attack on one victim.

In another method, PI2 102 is considered true if it was provided to a service that fraudsters don't have incentive to defraud. For example, a fraudster that gained access to another person's credit card details would have no reason to register to a free online dating service with the name registered on that card. Therefore, a PI2 102 received at a free online dating service (e.g. during registration) can be considered true.

In another method, PI2 102 is considered true if it is associated with significant online activity typical of legitimate users. Since fraudsters impersonate a victim only for fraud purposes, 'significant online activity' is defined as the use of a stolen identity beyond that needed for fraud purposes. For example, if PI2 102 was provided during registration to a web-based email service, and the associated email account is shown to send and receive numerous meaningful messages from other legitimate users, then PI2 102 can be considered true.

In yet another method, PI2 102 is considered true when the device used by Sender of PI2 106 does not appear to have been cleaned from cookies and other unique information elements. This may be used to verify PI2 102 since fraudsters tend to clean their devices from such information elements before committing fraud, in order to complicate future fraud investigations. Checking whether the device is clean can be done by using the methods described above for obtaining an SI (and especially methods for obtaining a cookie or a username and a password), wherein a failure to obtain any SI is indicative of a clean device.

It should be noted that implementation of the present invention changes the benefits malevolent users can gain from sending a PI2 102 in conditions which are considered atypical of fraud. Specifically, by doing so they may increase the likelihood that a fraudulent transaction is accepted based on incorrect verification of PI1 100.

It can be expected that as fraudsters become aware of the present invention, they will attempt to imitate such conditions, thus making them no longer 'atypical to fraud'. Therefore, the number of fraudsters aware of the present invention at the time at which PI2 102 was sent should be considered when estimating whether PI2 102 was received in conditions atypical to fraud.

Trustable Authorized Agent

In another method, PI2 102 is considered true if it was provided by an authorized agent of Sender of PI2 106 (as described above), and the authorized agent is known to be trustable. For example, a system administrator at a large company can be trusted to provide real details when registering a new employee on the company's email server. Assuming that only a system administrator can perform registrations, a PI2 102 sent to a company email server during registration can be considered true.

Recursive

Another alternative is to use the present invention recursively to verify PI2 102. In this case, PI2 102 is verified to satisfy the Verification Conditions with another PI (PI3): PI2 102 should identify the same person as PI3, Sender of PI2 106 and Sender of PI3 should be the same person, and PI3 should be true.

This effectively creates a verification chain where PI1 100 is verified by PI2 102, which in turn is verified by PI3 and so on.

System

Figure 3:
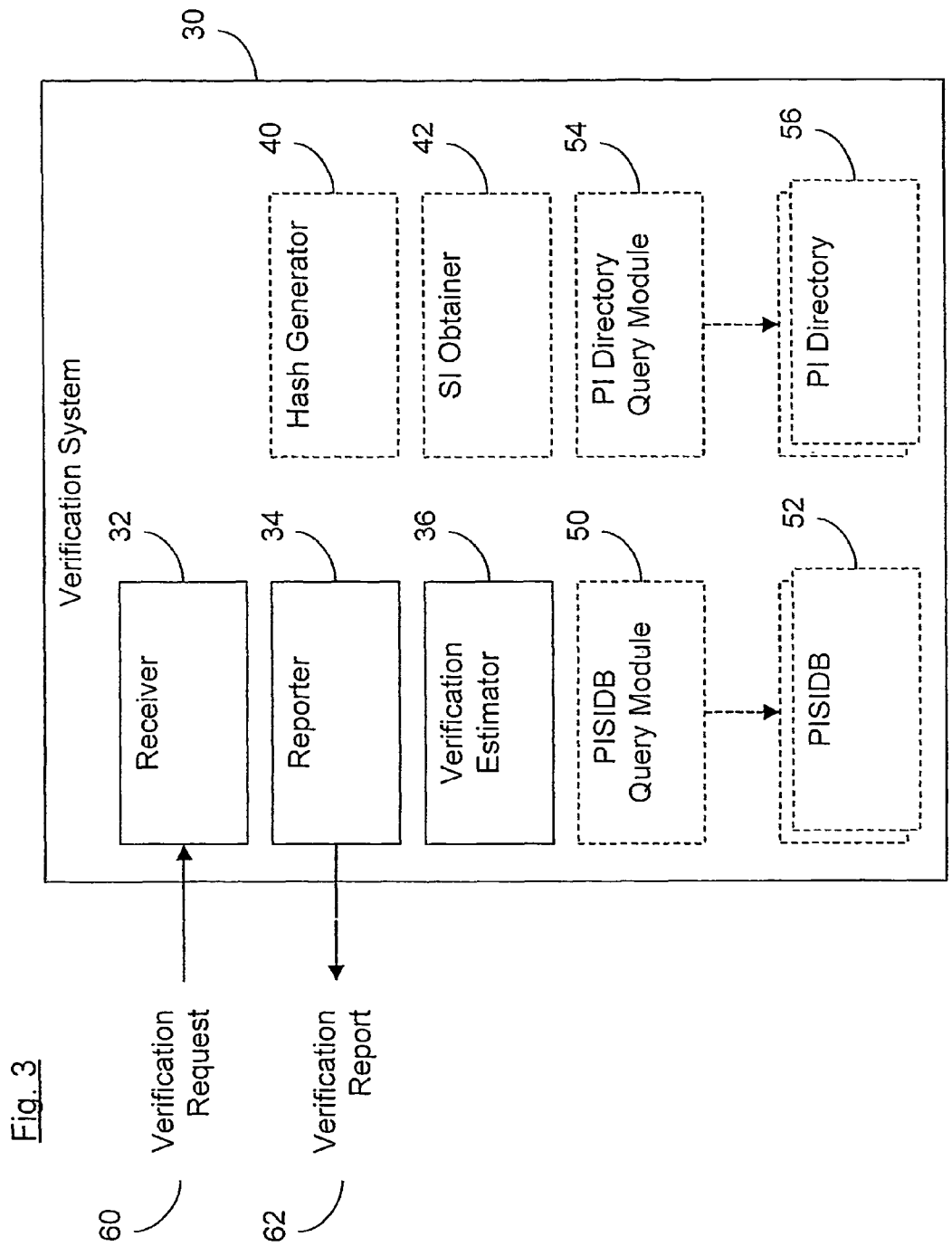
FIG. 3 describes the components of the system in accordance with a preferred embodiment of the present invention.

FIG. 3 describes the components of Verification System 30.

Receiver 32 is responsible for receiving a Verification Request 60, and Reporter 34 for sending a Verification Report 62.

Verification Estimator 36 is responsible for estimating whether the Verification Conditions are true, as described in detail above.

Verification System 30 may optionally include a PI Directory Query Module 54 used for sending a query to at least one PI Directory 56. Verification System 30 may optionally include one or more PI Directories 56.

The PI Directory Query Module 54 and the PI Directories 56 assist Verification Estimator 36 in checking the SPC, as described in detail above.

Verification System 30 may optionally include a PI-SI Database (PISIDB) Query Module 50, used for querying at least one PISIDB 52.

Verification System 30 may optionally include one or more PISIDBs 52. A PISIDB 52 is a database, containing PI-SI records. Each PI-SI record contains a PI and SI that may be used as PI2 102 and SI2 in estimating the Verification Conditions. Each such SI is an indication of the sender of the PI in the same record. Each record may optionally include additional such SIs. Each record may optionally include PI2 Verification Information (PI2VI). PI2VI is information relevant for determining whether PI2 is true. For example, PI2VI may contain results of a standard online verification process, the time in which PI2 was sent (or received), results of a verification of PI2 using the present invention etc. PI2VI may be omitted, for example, when PISIDB 52 is known to contain only records with verified PIs, when PI is considered true due to its content etc.

Normally, PISIDB 52 would be a standard relational database, thus making the association of SIs and PIs straightforward. In other cases PISIDB 52 may be a text log file, in which case the association could be that associated SIs and PIs are logged between two subsequent text delimiters (e.g. they are on the same line, or on different lines but between two subsequent empty lines etc.)

An example of a PISIDB 52 is a database in which each record contains a credit card number (PI2 102) and the IP address from which that number was received (SI2). Another example is a database in which each record contains a name and home address (PI2 102) received in a communication, a unique cookie sent to the sender of that communication (SI2), and the time in which the name and address were received (PI2VI). Another example is a database owned by an IMS in which each record contains a name and age (PI2 102) received when a user registered to the service, a unique identifier (SI2) assigned to the user's IMC during registration, and the time of registration (PI2VI).

Verification System 30 may optionally include a Hash Generator 40, used for generating hashes of PIs and other information elements, as described in detail below.

Verification System 30 may optionally include an SI Obtainer 42, used for obtaining SIs as described in detail above.

Verification System 30 can be physically located at any location, including at OSP 14 or at an independent operator. The components of Verification System 30 can be distributed between several different locations. For example, if PISIDB 52 is owned by an online service provider that requires it to stay at its premises, then all components of Verification System 30 can be located anywhere, except for PISIDB 52, which will remain at that online service provider, and PISIDB Query Module 50 will communicate with it over a data network.

When two components of Verification System 30 are located on the same device or on geographically close devices, they may communicate over an internal data bus or over a Local Area Network, respectively. When they are located further apart they may communicate over any applicable Wide Area Network, such as the Internet, a private data network, a CATV data network and a mobile data network. Alternatively, the two components may be two software components running on the same Central Processing Unit (CPU), or two parts of one software component, in which case they communicate using internal elements of the CPU. Preferably any communication over public networks is done using secure authenticated communication channels such as the Transport Layer Security (ITS; see RFC 2246) protocol. The same communication options are applicable to entities communicating with Verification System 30 (e.g. User Device 12 and OSP 14).

It is also almost always beneficial to use a secure communication channel such as HTTPS for communication between User Device 12 and OSP 14. For example, if OSP 14 receives PI1 100 and SI1 using a non-secure connection to User Device 12, and SI1 is a secret, a fraudster would be able to obtain both PI1 and the associated SI1 by eavesdropping, and then use them to impersonate User 10. A secure connection to User Device 12 would render this attack considerably more difficult.

Process

Figure 4:
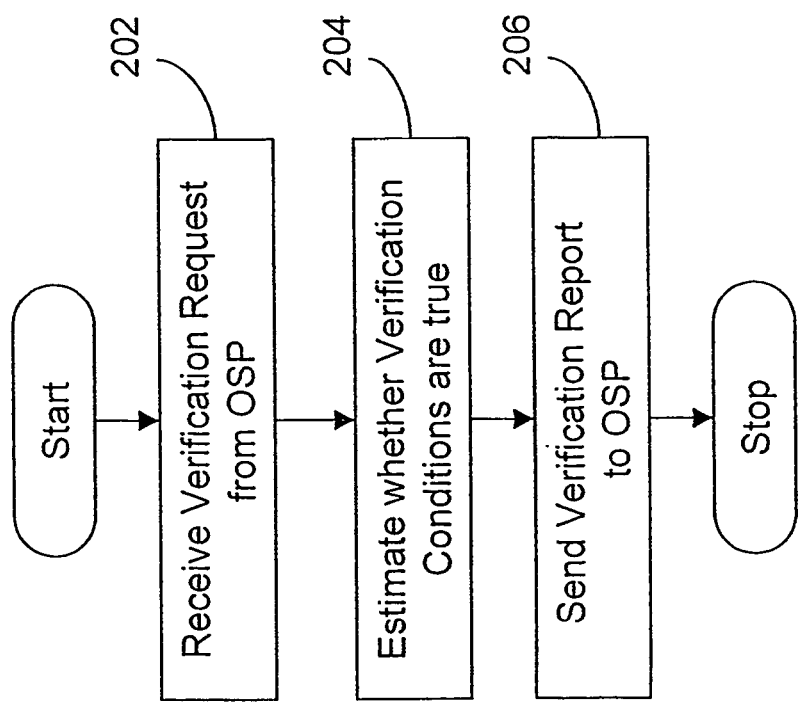
FIG. 4 describes a typical verification process in accordance with a preferred embodiment of the present invention.

FIG. 4 describes a typical verification process in accordance with a preferred embodiment of the present invention.

As OSP 14 wishes to verify PI1 100 that it received, it sends a Verification Request 60 to Receiver 32 of Verification System 30 (step 202). The Verification Request 60 contains PI1 100 and it may optionally contain SI1 and/or PI2 102 and/or SI2 and/or PI2VI. It may also contain any further information, which can assist Verification System 30 in its task (e.g. a PI used to narrow PI Directory queries, as described above).

Next, Verification Estimator 36 estimates whether each of the Verification Conditions is true (step 204). As described in detail above, this is usually done by examination of the information elements PI1 100, PI2 102, SI1, SI2 and sometimes PI2VI. If all required information elements are available, Verification Estimator 36 can check the Verification Conditions directly.

If some information elements are missing, Verification Estimator 36 can use PISIDB Query Module 50 to check the Verification Conditions that are relevant to the missing information elements. It can do so by retrieving such information elements, by making queries as to whether information elements that satisfy the relevant Verification Conditions exist ('a conditional query'), or by a combination of both. Specifically, Verification Estimator 36 can instruct PISIDB Query Module 50 to query for a PI-SI record satisfying some of the Verification Conditions, and then retrieve from such record (or records) the elements required for checking the remaining Verification Conditions.

Verification Estimator 36 can then proceed to checking the Verification Conditions, by examining (a) the information elements provided in Verification Request 60; (b) the information elements retrieved by PISIDB Query Module 50; and (c) the results of conditional queries. It should be noted that in the context of the present invention, examination of the result of a conditional query is considered equivalent to estimating whether the relevant condition is true.

For example, PISIDB Query Module 52 retrieves a record in which PI2 102 identifies the same person as PI1 100 and PI2VI indicates that PI2 102 was verified, and then Verification Estimator 36 checks that SI2 in the retrieved record and SI1 indicate that Sender of PI1 104 and Sender of PI2 106 are the same person. In another example, PISIDB Query Module 50 retrieves a record in which SI2 and SI1 indicate that Sender of PI1 104 and Sender of PI2 106 are the same person, and then Verification Estimator 36 checks that PI2 102 in the retrieved record identifies the same person as PI1 100, and that PI2VI in the retrieved record indicates that PI2 102 was verified. In another example, PISIDB Query Module 50 only checks for the existence of a record in which all the Verification Conditions are satisfied, without retrieving any information from that record.

In some cases, PI2 102 and/or its associated PI2VI are kept on User Device 12. For example, the full name of User 10 and the time it was provided may be kept in a cookie, which can be obtained using any of the methods described above. In another example, the name and time are kept by a software client installed on User Device 12, which may send them upon receiving an identification request in some proprietary protocol. When receiving PI2 102 or PI2VI directly from User Device 12 (or from any other non-trusted source) the data should be somehow protected, since a fraudster could easily fabricate such data and defraud the system. Examples of data protection methods are the HMAC algorithm, or RSA signature. When using such methods, Verification System 30 should request the owner of the data (i.e. the party that protected it) to verify its authenticity. Alternatively, the owner of the data may provide the required details of the data protection methods (e.g. the relevant cryptographic keys) to Verification System 30, so it could verify the authenticity of the data.

Last, Reporter 34 sends a Verification Report 62 to OSP 14 (step 206), indicating whether PI 100 Is true, as estimated by Verification Estimator 36.

Verification Report 62 may provide a positive response if all Verification Conditions were satisfied. It may provide a negative response if not all Verification Conditions were satisfied. It may provide a score describing the probability that PI1 100 is true. Methods of deciding what response to send, and how to calculate the score are described below.

Verification Report 62 may also include further information from the verification process, such as the information elements used in the process (e.g. PI2 102, SI2, PI2VI), SPR strength, SSR strength or PI2 Verification Level.

If PI1 100 is a set of PIs (e.g. a name and an address), Verification Report 62 may provide separate results for each subset of PI1 100, or for some subsets (e.g. if PI2 102 matched only one of the PIs).

In some cases it may be beneficial to query a PISIDB 52 multiple times. For example, if SSR is based on IP address similarity, an FVW may receive a message from User 10 including his name (PI2 102) and current IP address (SI2) only after OSP 14 sent Verification Request 60. In this case, a relevant record in PISIDB 52 is created after Verification Request 60 was sent, and a Verification Report 62 is sent when this record is found (even if another Verification Report 62 was already sent). Alternatively, PISIDB 52 can send such an update without explicitly receiving another query from PISIDB Query Module 50.

PI1 Verification Level

The verification level achieved by the present invention is not absolute, and so it is possible for a false PI1 100 to be considered true, and for a true PI1 100 to be considered false. The probability of such failures varies and depends on many factors.

OSP 14 should decide its verification level requirements. Setting such requirements limits its exposure to fraud ('False Negatives') as well as the probability of rejecting a true PI1 100 ('False Positives'). Such requirements are usually set in accordance with the associated risks and benefits. For example, an online merchant considering shipping a costly item at low profit (e.g. a television) should require a higher verification level than if shipping an inexpensive item at high profit (e.g. a software product).

Since the present invention relies on the three Verification Conditions, the verification level of PI1 100 depends on the SSR strength, the SPR strength and the verification level of PI2 102. When these are higher, PI1 100 verification level is higher.

In estimating PI1 100 verification level, all possible fraud scenarios should be considered, and the difficulties they present to the fraudster. Since most fraud attacks rely on compromising at least one of these relations, the probability of PI1 100 being considered true when it is false depends on the probability that these relations be compromised.

The accuracy and reliability of external data sources used in the verification process may also affect PI1 100 verification level. PI Directories 56, PISIDBs 52, DNS, and 'whois' are all examples of such data sources.

Several methods exist for estimating PI1 100 verification level and setting verification level requirements.

One method is using rule-based logic to define which cases are accepted and which rejected. For example, the system can be configured to provide a positive report only in cases where (a) PI1 100 is a card number, (b) a secure cookie is obtained from User Device 12, (c) the cookie is associated with a name (PI2 102) at a PISIDB 52, (d) the name is identical to the cardholder's name associated with PI1 100 at the card issuer, and (e) PI2 102 was provided at least 6 months before PI1 100.

Another method is using automated learning technologies such as neural networks. For example, a neural network can receive as inputs all the relevant parameters (e.g. how PI2 102 was verified, method of SSR, strength of SPR etc.) and generate an estimate of whether PI1 100 is true or false. A system using such technologies requires a training phase, in which inputs are provided coupled with the expected response, and the system adjusts itself so that correct responses will be generated for inputs in the future.

Another method is using probabilistic analysis. In this method all relevant information is examined as evidence to support each of the possible hypotheses (true PI1 100 or false PI1 100). Using standard conditional probability calculations (e.g. Bayes' Theorem), the probability of PI1 100 being false can be calculated. This probability can be compared to a threshold representing the maximum acceptable risk, and PI1 100 is considered false if the probability is above this threshold.

PI-SI Correlation

When using a secret as an SI, its strength should be examined in view of the fact that a fraudster is normally aware of the identity of his victim. This causes secrets that are correlated with a PI of the person identified by PI1 100 to be weaker.

For example, a username, an email address or a name in a 'From:' SMTP header are all likely to contain the name of the sender or some derivative of it (e.g. likely usernames for John Smith are johnsmith, john_smith, jsmith, johns etc.). Therefore, they are not considered strong secrets, since a fraudster can more easily guess them if he knows the victim's name.

In another example, a fraudster aware of his victim's home address connects to an ISP POP close to that address, and is assigned an IP address from that POP. This increases the likelihood that the present invention will find this IP address to be related to an IP address that the victim used in the past for supplying PI2 102. This reduces the strength of an IP address as a secret, but not as a 'Reliable Address' (e.g. the victim may have a designated IP address, which his ISP will not assign to other users, so the fraudster can not use that specific IP address even if he knows it).

Another correlation that affects the strength of a secret is between the persons likely to impersonate a user and the persons having access to the secret used as an SI of that user. When this correlation is strong the secret is weaker.

For example, a student may steal a credit card from his teacher, and use it to buy online from a computer in the school's library. This computer may have been previously used by the teacher and contain a secret cookie assigned to the teacher. Since students having access to the computer are more likely to impersonate the teacher than a random fraudster, the secret is weaker and should be treated as such.

In a similar manner, a child may use a parent's credit card to buy online from the parent's computer.

It should be noted that such a correlation could also result in correctly verifying a PI1 100, even when PI2 102 does not identify the same person. This could happen if the user can access another user's secret for the same reason they are both identified by the same PI. For example, a parent used the family's computer to register to an online service where he provided his family name (PI2 102) and received a secret cookie. A child uses the same computer to register to another online service, sending his full name (PI1 100). The secret cookie is obtained, and PI2 102 is retrieved and found to match PI1 100 (the same family name). In this case, even though PI1 100 and PI2 102 were sent by different senders and identify different persons, the fact that the same computer was used by people with the same family name allowed for a correct verification of PI1 100.

Miscellaneous

Hasting

In cases where OSP 14 does not control all components of Verification System 30, it may be required that OSP 14 not reveal significant identifying information of User 10 to Verification System 30. In such cases, PI1 100 (or part of it) may be hashed before being sent to Verification System 30 in Verification Request 60. In this context, we define hashing as a method of mapping one information-set (the source) to another (the hash) in such a way that (a) the same source information always generates the same hash, and (b) it is difficult to deduce the source information from the hash. One popular hashing method is the MD5 message digest algorithm (MD5; see RFC 1321).

When receiving a hashed PI1 100, Verification System 30 should hash PI2 102 (or a PI from a PI Directory) in the same manner that PI1 100 was hashed, before it can compare them. Since the same information always generates the same hash, PI1 100 can still be shown to be identical to PI2 102, and since it is difficult to deduce the original information from the hash, information confidentiality is preserved.

It should be noted, that partial comparisons or comparisons that require more complex processing can not be done with a hashed PI, since two similar non-identical information elements do not normally remain similar after hashing. Such comparisons can still be possible if only part of PI1 100 and PI2 102 are hashed (e.g. only the last digits of a phone number), or if they are processed before being hashed (e.g. rewriting words in a definite spelling method, to prevent spelling differences).

If PISIDB 52 is external to Verification System 30, it may also be required that PI2 102 from PISIDB 52 will not be revealed to Verification System 30. In such cases, the information may be hashed in the same manner before being sent in the response to PISIDB Query Module 50.

It may also be required that PI1 100 not be revealed to the owner of PISIDB 52 (assuming Verification System 30 receives it unhashed). In this case, Verification System 30 will hash PI1 100 before sending it in a query to PISIDB 52, and PISIDB 52 will hash PIs in PI-SI records before comparing them to PI1 100.

It should be noted that if the source information set is relatively small, it might be possible to detect the source information from the hash. For example, since there are less than ten billion valid phone numbers in North America, one may be able to deduce a phone number from its hash by going through the hashes of all the possible phone numbers. In such cases it may be beneficial to reduce the hash size so there will be many possible source information instances for each hash (e.g. if there are ten billion phone numbers and a hash size of 3 decimal digits is used, each hash value can be the hash of any one of ten million phone numbers on average). However, this increases the likelihood that two different information instances will be considered identical when they are not. Therefore, hash sizes should be set so they produce the best balance between information confidentiality and the acceptable level of false verifications.

It should also be noted that similar procedures could be used for SI1 and SI2, or any other information element.

Verification with Multiple PIs

Better verification of PI1 100 may be achieved by checking the Verification Conditions with additional PIs (other than PI2 102). Normally, this involves finding a relation between SI1 and additional SIs (other than SI2) associated with the additional PIs.

For example, finding two occasions in which the same credit card number as in PI1 100 was provided, from a similar IP address as SI1 and it was successfully charged would increase the verification level of PI1 100 compared to finding only one such occasion.

Each of the additional PIs may have been sent to the same entity or to different entities, and may be retrieved from the same PISIDB 52 or from different PISIDBs 52.

Furthermore, allowing Verification System 30 access to more than one PISIDB 52 increases the probability of finding a relevant PI-SI record, thereby increasing the number of cases Verification System 30 may be successfully used.

Performance and economic considerations may require that only a subset of accessible PISIDBs 52, a subset of records in each PISIDB 52, or a subset of SIs obtainable by SI Obtainer 42 be used. Similar considerations may also require that the chosen elements be used in a specific order.

Deciding which subset to use and at what order may be based on relations between OSP 14 and owners of PISIDBs 52 (e.g. knowing that users of one OSP 14 are more likely to be registered at a specific PISIDB 52), or on knowing which SIs proved useful during previous similar verification processes, or on any other suitable factor.

For example, if Verification System 30 intends to try to obtain several cookies from User Device 12, it may not always be effective to obtain them in parallel, because obtaining each cookie would require User Device 12 to send a different request, each loading User Device 12 and its connection to the Internet. It would therefore be more effective to first obtain cookies that are more likely to produce positive verification results.

Queries to PISIDBs 52 can be used in deciding which SIs to obtain. For example, if Verification System 30 has access to several PISIDBs 52, in which the SIs are cookies, and the cookies of different PISIDBs 52 are limited to different domains, then it may be beneficial to first query each PISIDB 52 for a PI2 102 that matches PI1 100, and then obtain only cookies of PISIDBs 52 that provided a positive response. This way the interaction with User Device 12 may be reduced significantly.

Verification Report 62 may express the fact that more than one PI was used in the verification process. For example, it may be expressed in the score describing PI1 100 verification level, by providing separate responses for each PI used, or by providing a list of the PIs (and SIs) used.

Combining with Other Methods

While the method of the present invention provides an alternative to other methods of verifying a person identifier, it may also cooperate with such methods. For example, the results of the method of the present invention can be combined with the results of a fraud prediction model based on pattern recognition, generating a score representing the probability that PI1 100 is true. Such combination is normally done using conditional probability calculations, such as Bayes' Theorem.

Multiple OSPs

The system and method described above assumed a single OSP 14. Nevertheless, it is more reasonable to assume a large number of online service providers will use such a service. The main difference in such a case is that Verification System 30 should make sure Verification Report 62 is sent to the sender of the matching Verification Request 60. Persons skilled in the art will appreciate that making this change is straightforward.

Applicable Environments

While the present invention mainly discusses aspects related to the Internet, it will be appreciated by persons skilled in the art that it may be easily extended to any environment where two messages from the same sender can be determined to be from the same sender.

EXAMPLES

Several options for operation of the present invention were described above. To assist in understanding the various options, following are provided a few comprehensive examples of the present invention:

Online Merchant Cooperation

Merchant A is an online merchant. He receives from a user, over an HTTPS connection, an order to purchase a product. This order contains payment details, which include a credit card number and the name on the card.

Merchant A then creates a 24-bit hash of the payment details, and sends it in a Verification Request 60 to Receiver 32 of Verification System 30. Merchant A also provides the user with an embedded image in an HTML page that points to SI Obtainer 42 of Verification System 30. PISIDB Query Module 50 creates a query including this hash and sends it to Merchants B, C and D. Each of the merchants' PISIDB 52 is checked to contain a record with payment details from a previous purchase that would match the given hash Merchant B and Merchant C respond to the PISIDB Query Module 50 that they have such a record. SI Obtainer 42 decides to obtain the cookie of Merchant C, and it redirects the user to another address of SI Obtainer 42 under the domain of Merchant C. The user's device sends to SI Obtainer 42 the cookie of Merchant C, and PISIDB Query Module 50 sends a query including the hash and the cookie to Merchant C.

Merchant C responds to PISIDB Query Module 50 that a record matching both the hash and the cookie exists and the credit card account in that record was successfully charged 10 months ago.

Verification Estimator 36 uses rule-based logic to decide that the payment details are true, and Reporter 34 sends Merchant A a Verification Report 62 containing a positive response.

Merchant A decides to provide the product to the user.

In this example the following options were implemented:

OSP 14 is an online merchant.

PI1 100 is a credit card number and the name on the card provided to Merchant A.

PI2 102 is a credit card number and the name on the card provided to Merchant C.

PISIDB 52 is Merchant C's transaction database.

PI2VI is the result and time of the transaction conducted following receipt of PI2 102.

SPR was based on PI1 100 and PI2 102 being identical.

SSR was based on (a) PI1 100 was contained in the HTTPS request; (b) a secret URL was sent to the sender of the HTTPS request; (c) a secret cookie was received with the secret URL; and (d) the same secret cookie was assigned by Merchant C to the user who provided PI2 102.

PTC was based on Merchant C charging the credit card account in PI2 102, and receiving no dispute for 10 months.

Hashing was used to prevent exposure of PI1 100 to entities that don't already have that information.

A hash of PI1 100 was sent to several owners of PISIDBs 52 in order to determine which cookies to obtain.

Rule-based logic was used to determine whether to provide a positive or negative Verification Report 62.

Messenger-Fraud Service

An online merchant receives from a user, over an HTTPS connection, an order to purchase a product. This order contains payment details, which include a credit card number and the billing address (the address registered at the credit card issuer for that card). The merchant then sends the payment details and the IP of the user (from the HTTPS connection) in a Verification Request 60 to a fraud prediction service (FPS).

The FPS estimates whether transactions are fraudulent by examining details such as whether the billing address matches the card, and whether that address is in a location where many fraud incidents occurred etc. The FPS operates the Verification System 30 and uses it to verify transactions that its other methods consider high-risk. The FPS decides the current transaction is high-risk, and forwards the Verification Request 60 to Receiver 32 of Verification System 30.

Verification System 30 sends a query through its PISIDB Query Module 50 to an IMS, including the IP address. The IMS finds that an IMC has recently logged in on that IP (sending its unique identifier). The IMS checks what name was provided when the user registered to the IMS (and was assigned the unique identifier), and responds to PISIDB Query Module 50 with the name and the time at which the name was provided.

PI Directory Query Module 54 checks whether (a) a person by that name lives at the specified billing address, by checking a white pages directory; and (b) the billing address matches the credit card number, by using an AVS service.

Verification Estimator 36 then provides a neural network with information about the popularity of the name, the number of people living at the billing address, the time at which the name was provided to the IMS, the FPS's preliminary estimate of the probability that the transaction is fraudulent etc.

The neural network then provides a fraction between 0 and 1 representing an updated estimate of the probability that the transaction is fraudulent (i.e. that the credit card number does not belong to the user who provided it), based on information sets it received in its training phase.

Reporter 34 sends a Verification Report 62 including the fraction to the merchant.

The merchant decides the risk is acceptable and provides the product to the user.

In this example the following options were implemented:

OSP 14 is an online merchant.

PI1 100 is the credit card number provided to the merchant. A billing address is provided to assist in the use of the white pages directory and AVS.

PI2 102 is the fill name provided in registration to an IMS.

PISIDB 52 is an IMS database of the registered users, associating the unique identifiers of their IMCs with their names.

PI2VI is the timestamp describing when PI2 102 was received.

SPR was based on two PI Directories. One associating the name with the billing address (white pages), and one associating the billing address with the credit card number (the credit card issuer's billing address directory accessible through the AVS).

SSR was based on (a) PI1 100 was contained in the HTTPS request; (b) the IP address from the HTTPS session is identical to the IP address from the login message sent from the IMC to the IMS; (c) the login message contained the unique identifier; and (d) the unique identifier was assigned to the user who provided PI2 102.

PTC was based on PI2 102 being received a significantly long time before PI1 100.

A neural network was used to analyze the data and estimate the probability that PI1 100 is true.

The neural network also combined the results of Verification System 30 with the FPS's preliminary results.

Anonymous Messenger-Fraud Service

This example is similar to the messenger-fraud service example described above, except that the IMS is an anonymous service and the user never supplied any PI when registering to it. The IMC does, however, report a unique secret identifier when connecting.

In this case the FPS maintains a PISIDB 52 of all previous successful transactions including the card number and IP address from which the transaction was conducted.

The IMS records are not used as a PISIDB 52 as in the previous example, but rather to associate two IP addresses at different times as belonging to the same user. Specifically, the IMS finds that the IMC that logged in at the IP address (IPA) reported for the current transaction had previously logged in at another IP address (IPB).

PISIDB Query Module 50 would then retrieve from PISIDB 52 the card number associated with IPB, and Verification Estimator 36 would compare it with the card number reported by the merchant.

If they match, Reporter 34 sends a Verification Report 62 containing a positive response to the merchant, who decides to provide the product to the user.

In this example the following options were implemented:
OSP 14 is an online merchant.
PI1 100 is a card number.
PI2 102 is a card number.
PISIDB 52 is the FPS database of past transactions and associated IP addresses.
PI2VI is not explicitly sent, since PISIDB 52 includes only successful transactions.
SPR was based on PI1 100 and PI2 102 being identical.
SSR was based on (a) PI1 100 was contained in the HTTPS request; (b) the IP address from the HTTPS session is identical to the IP address from the login message sent from the IMC to the IMS; (c) The unique secret identifier reported in the IMC login message is identical to the identifier reported in a previous login message; (d) the IP address from the previous login message is identical to the IP address of a previous transaction including PI2 102.
PTC was based on a successful transaction based on PI2 102.
Rule-based logic was used to determine whether to provide a positive or negative Verification Report 62.

Web-Based Email Service (WBES)

As most users access their email accounts frequently, WBES sites (described above) are frequently visited websites (described above) and they are aware of the current IP addresses of many of their users. Furthermore, they can gain information on current and past IP addresses of these and other users by analyzing incoming emails. In both cases, they have the full name of the users, as provided during registration or in an incoming email, as described in detail above.

A WBES can use this information to create a PISIDB 52 for use by Verification System 30. In many cases, the company owning a WBES has relations with many online merchants for other purposes (e.g. the Passport service by Microsoft, or Yahoo Shopping by Yahoo), which can be expanded for this purpose.

In this example, an online merchant receives from a user, over an HTTPS connection, an order to purchase a product. This order contains shipping details for sending the item. The shipping details contain a name and address. The merchant then sends the shipping details and the IP of the user (from the HTTPS connection) in a Verification Request 60 to Receiver 32 of Verification System 30 operated by a WBES.

PISIDB Query Module 50 checks whether a user by that name has logged in to the WBES and whether an email from a user by that name was received. It finds a record of an email from that name received 18 months before the purchase order was sent from the user to the online merchant.

Verification Estimator 36 finds the IP address from the email and the IP address in Verification Request 60 to be identical. The PI Directory Query Module 54 finds that a person by that name lives at the specified shipping address, by checking a white pages directory. Since the email was sent a significant time before the purchase order, the shipping address is considered the real shipping address of the user requesting the product. Usually, this would further indicate the transaction is legitimate (as most fraudsters would not send stolen goods to their real address).

Reporter 34 sends a Verification Report 62 containing a positive response to the merchant, who decides to provide the product to the user.

In this example the following options were implemented:
OSP 14 is an online merchant.
PI1 100 is a shipping address. A full name was provided to narrow down the number of queries to the PISIDB 52 instead of querying all the names residing in the shipping address.
PI2 102 is a full name.
PISIDB 52 is the WBES database of past logins and incoming emails, associating names with IP addresses.
PI2VI is the time at which the email was received.
SPR was based on a white pages directory.
SSR was based on (a) PI1 100 was contained in the HTTPS request; (b) the IP address from the HTTPS session is identical to the IP address from the email message; (c) PI2 102 is contained in the email message.
PTC was based on PI2 102 being received 18 months before PI1 100.
Rule-based logic was used to determine whether to provide a positive or negative Verification Report 62.

Single Sign-On Service

A single sign-on service (SSO) allows users to login, or authenticate themselves to multiple online services using a single username and password. The SSO service maintains a PISIDB 52, in which each record contains a username and password as an SI, and the user's PIs provided during registration to the service (such as his full name, address, phone number and credit card details). In some cases, the username may also serve as a PI (e.g. if the username is derived from the user's name such as 'john_doe').

Examples of SSOs include Microsoft .NET Passport (www.passport.com) AOL ScreenName (my.screenname.aol.com) and the Liberty Alliance (www.projectliberty.org).

In this example, an online merchant receives from a user, over an HTTPS connection, an order to purchase a product. This order contains payment details, which include a credit card number.

The merchant redirects the user to an SSO for authentication using a Secret URL. The SSO uses SI Obtainer 42 of Verification System 30 to collect the user's username and password. If the user was successfully authenticated, PISIDB Query Module 50 retrieves from PISIDB 52 the full name associated with the username and password and the timestamp of when that full name was provided to the SSO. The full name, the timestamp and the secret from the Secret URL are then sent to the merchant.

The merchant then sends the credit card number, the full name and the timestamp in a Verification Request 60 to Receiver 32 of Verification System 30.

Verification Estimator 36 uses PI Directory Query Module 54 to check whether the full name matches the cardholder's name associated with that credit card number at the credit card issuer's database. It also uses the timestamp to check whether the full name was provided a significantly long time before the purchase order.

If both conditions are satisfied, Reporter 34 sends a Verification Report 62 containing a positive response to the merchant, who decides to provide the product to the user.

In this example the following options were implemented:
OSP 14 is an online merchant.
PI1 100 is a credit card number.
PI2 102 is a full name.
PISIDB 52 is the SSO database of registered users, associating usernames and passwords with users' PIs.
PI2VI is the time at which the full name was provided to the SSO.

SPR was based on a credit card issuer's database.

SSR was based on (a) PI1 100 was contained in the HTTPS request; (b) a secret URL was sent to the sender of the HTTPS request; (c) a username and password were received with the same secret URL; (d) PI2 102 was received with the same username and password.

PTC was based on PI2 102 being received a significantly long time before PI1 100.

Rule-based logic was used to determine whether to provide a positive or negative Verification Report 62.

Corporate Entail Verification

A corporate email system allows-users to access their mailboxes using a username and password. The system maintains a PISIDB 52, in which each record contains a username and password as an SI. The username also serves as a PI by combining it with the corporation's domain name to create the user's email address (e.g. 'john_doe@acme.com' is John Doe working for Acme Inc.).

In this example, an online merchant receives from a user, over an HTTPS connection, an order to purchase a product. This order contains payment details, which include a credit card number, the cardholder name and an email address.

The merchant assigns the user providing the payment details a secure secret cookie. The merchant then sends an email containing an HTTPS link to the merchant with a secret URL to the email address provided by the user. To access the email, the user provides his username and password to the corporate email system. By clicking the link, the user sends the secret URL to the merchant along with the secure secret cookie. This proves that the user providing the payment details has access to the email address he provided.

The merchant then sends to Receiver 32 of Verification System 30 a Verification Request 60 containing the credit card number, the cardholder name, the email address and a flag indicating that the secret URL was received with the secure secret cookie.

Verification Estimator 36 finds that the email address is similar to the cardholder's name (alternatively, PI Directory Query Module 54 may find the email address to be associated with the cardholder's name in an email directory). Verification Estimator 36 determines the email address to be of a trustable corporation (e.g. by checking 'whois' information associated with the email domain, querying business databases, contacting the corporation offline etc.). As a corporate email address, it is assumed to have been created by a trustable authorized agent of the user (e.g. the email server's system administrator), and is therefore a reliable indication of the user's real name. PI Directory Query Module 54 then finds that the cardholder's name matches the credit card number, by querying a database of the credit card's issuer.

Reporter 34 sends a Verification Report 62 containing a positive response to the merchant, who decides to provide the product to the user.

In this example the following options were implemented:
OSP 14 is an online merchant.
PI1 100 is a credit card number. The cardholder's name was provided to allow Verificator Estimator 36 to check the SPC even in cases where the user's name is not apparent from the email address (e.g. 'jdoe@mail.com' may be any one of John Doe, Jane Doe, Jeff Doe etc.). An email address was provided to allow the merchant to send an email to the user, thereby enabling the verification process.
PI2 102 is the email address assigned to the user at the corporate email server.
PISIDB 52 is the corporate email server's username-password database.

PI2VI is the domain of the email address, indicating that the email server is of a trustable corporate.

SPR was based on the email address being similar to cardholder's name (or associated with it in an email directory), and the cardholder's name matching the credit card number in the credit card issuer's database.

SSR was based on (a) PI1 100 was contained in the HTTPS request; (b) a secure secret cookie was sent to the sender of the HTTPS request; (c) a username and password were received by the email server; (d) a secret URL was sent from the email server to the sender of the username and password; (e) the secure secret cookie and secret URL were received in the same HTTPS request; (f) PI2 102 was received with the same username and password when the email server's system administrator registered the user.

PTC was based on PI2 102 being received from a trustable authorized agent of the user.

Rule-based logic was used to determine whether to provide a positive or negative Verification Report 62.

Public Email Verification

In this example, the same method is used as the corporate email verification method described above, except that the email server is public (e.g. a WBES) and therefore PI2 102 (the chosen email address) is not provided by a trustable authorized agent. Instead, PTC is checked by accessing a database describing the time at which PI2 102 was provided to the email server. Such a database could be provided by the operator of the email server, or derived from indications that the email address was deliverable at some time in the past (assuming abandoned email addresses are not recycled and assigned to other users). Such indications include an email message being sent to the email address or finding that the email address is included in direct marketing databases.

In this example the following options were implemented:
OSP 14 is an online merchant.
PI1 100 is a credit card number. The cardholder's name was provided to allow Verificator Estimator 36 to check the SPC even in case where the user's name is not apparent from the email address. An email address was provided to allow the merchant to send an email to the user, thereby enabling the verification process.
PI2 102 is the email address chosen by the user at the public email server.
PISIDB 52 is the public email server's username-password database.
PI2VI is the indication that the email account was created a significantly long time before the purchase order.

SPR was based on the email address being similar to cardholder's name (or associated with it in an email directory), and the cardholder's name matching the credit card number in the credit card issuer's database.

SSR was based on (a) PI1 100 was contained in the HTTPS request; (b) a secure secret cookie was sent to the sender of the HTTPS request; (c) a username and password were received by the email server; (d) a secret URL was sent from the email server to the sender of the username and password; (e) the secure secret cookie and secret URL were received in the same HTTPS request; (f) PI2 102 was received with the same username and password when the user registered on the public email server.

PTC was based on PI2 102 being received a significantly long time before PI1 100.

Rule-based logic was used to determine whether to provide a positive or negative Verification Report 62.

Issuer Side Authentication

The credit card issuer is often viewed as the party best suited to authenticate a buyer during an online credit card transaction. In payment schemes offered by credit card organizations (e.g. SET from Visa and MasterCard, and '3D secure' from Visa described above) the issuer is responsible for the online authentication of the user.

The present invention can be used as an authentication method in such payment schemes, for example, by utilizing the issuer's online bill presentment system (OBPS; a system that allows the issuer's customers to view their account status online). When users visit the OBPS, they are required to provide some proof of identity (such as their credit card number, expiration date and a code printed on the monthly statement). If identification is successful a secure secret cookie is issued to the user, and associated with his account identifier (i.e. credit card number) in a PISIDB 52.

In the '3D Secure' case, an online merchant receives from a user over an HTTPS connection, an order to purchase a product. This order contains a credit card number. He causes the user to send an HTTPS request to SI Obtainer 42 of Verification System 30 (integrated into the issuer's '3D Secure' server, and using its domain), by opening a pop-up window. The merchant also sends the credit card number in a Verification Request 60 to Receiver 32 of Verification System 30. The Verification Request 60 and HTTPS request both contain the same secret to allow Verification System 30 to associate them, as described above.

Since the user is sending an HTTPS request to the issuer's domain over a secure connection, the secure secret cookie issued by the issuer's OBPS is exposed (if the domain used by the 3D Secure server is different than that of the OBPS, the user's device may be caused to connect to the OBPS domain). The identifier in the cookie is used as a key by PISIDB Query Module 50 to retrieve the associated credit card number from PISIDB 52. Verification Estimator 36 then compares it with the credit card number reported in the Verification Request 60.

If match, Reporter 34 sends a Verification Report 62 containing a positive response to the merchant, who decides to provide the product to the user.

In this example the following options were implemented:
OSP 14 is an online merchant.
PI1 100 is the credit card number provided to the merchant.
PI2 102 is the credit card number provided in registration to the OBPS.
PISIDB 52 is the issuer's OBPS database associating users' cookies with their credit card numbers.
PI2VI is not explicitly sent, as PISIDB 52 is known to contain only verified records.
SPR was based on PI1 100 and PI2 102 being identical.
SSR was based on (a) PI1 100 was contained in the HTTPS request to the merchant; (b) a secret URL was sent to the sender of that HTTPS request; (c) a secure secret cookie was sent with the secret URL; and (d) the same secret cookie was assigned by the OBPS when the user provided PI2 102.
PTC was based on the authentication process performed when the user registered to the OBPS (e.g. he provided a code from the monthly statement).
Rule-based logic was used to determine whether to provide a positive or negative Verification Report 62.

The invention claimed is:

1. A computer-implemented method of verifying a first person identifier, executed by a verification system realized by one or more computers connected to a data network, the method comprising:
Receiving a Verification Request including the first person identifier in a first message sent via the data network by a first sender; and
Estimating, by use of a data processor, whether Verification Conditions are true, the Verification Conditions including:
whether the first person identifier and a second person identifier satisfy a Same Person Condition, the second person identifier being received in a second message at a different time from a time when the first message is received, the second message being sent via the data network by a second sender, wherein the Same Person Condition is satisfied if the first person identifier and the second person identifier have a Same Person Relation that includes at least one relation between the first person identifier and the second person identifier selected from the group consisting of:
the first person identifier and the second person identifier include substantially similar portions,
the first person identifier and the second person identifier are verified against encrypted person identifier information stored in a user device, the encrypted person identifier information being accessed upon request to an encrypting authority,
the first person identifier and the second person identifier include geographically proximate geographical parameters, and
each of the first person identifier and the second person identifier has a respective Same Person Relation with a third person identifier,
whether the first sender and the second sender satisfy a Same Sender Condition, wherein the Same Sender Condition is satisfied if, based on a comparison between information associated with the first message and information associated with the second message, the first message and the second message have a Same Sender Relation that includes at least one relation, between the first message and the second message, selected from the group consisting of:
there is a relation between a reliable network address of the first sender and a reliable network address of the second sender,
a first secret known to the first sender and a second secret contained in the second message are derivatives of a common secret, and
each of the first message and the second message has a respective Same Sender Relation with a third message, and
whether the second person identifier, previously determined to satisfy a Same Person Condition in relation to the first person identifier, identifies the second sender, previously determined to satisfy a Same Sender Condition in relation to the first sender.

2. The computer-implemented method of claim 1, further including sending a Verification Report indicating whether the first person identifier identifies the first sender, said Verification Report being based on results of said estimating.

3. The computer-implemented method of claim 1, wherein said Verification Request further includes at least one information element chosen from the group consisting of:
the second person identifier; and
the first person identifier.

4. The computer-implemented method of claim 1, wherein the estimating further includes:
Sending at least one query to at least one Person Identifier-Sender Identifier Database; and
Receiving at least one response to the at least one query.

5. The computer-implemented method of claim 4 wherein the at least one query is a conditional query describing at least one of the Verification Conditions.

6. The computer-implemented method of claim 5 including estimating whether the at least one response to the at least one query satisfies at least one of the verification Conditions other than the at least one Verification Condition that was described in the at least one query.

7. The computer-implemented method of claim 1, wherein the Same Person Condition is satisfied if the first person identifier and the second person identifier have a Same Person Relation that includes at least one relation between the first person identifier and the second person identifier selected from the group consisting of:
the first person identifier and the second person identifier include identical portions,
the first person identifier and the second person identifier include portions that are identical except for spelling differences,
a first of the first person identifier or the second person identifier includes an abbreviation of a second of the first person identifier or the second person identifier,
the first person identifier and the second person identifier include numerically similar phone numbers, and
a directory record associates a person identifier that has a Same Person Relation with a first of the first person identifier or the second person identifier with another person identifier that has a Same Person Relation with a second of the first person identifier or the second person identifier.

8. The computer-implemented method of claim 1, wherein the Same Sender Condition is satisfied if the first message and the second message have a Same Sender Relation that includes at least one relation, between the first message and the second message, selected from the group consisting of:
the first message and the second message are included in a common integral message,
there is a relation between a time the first message was sent and a time the second message was sent, and
a first secret contained in the first message and a second secret contained in the second message are derivatives of a common secret.

9. The computer-implemented method of claim 8, wherein the relation between the reliable network address of the first sender and the reliable network address of the second sender includes at least one relation selected from the group consisting of:
Identity of the reliable network address of the first sender and the reliable network address of the second sender;
Membership in a common sub-network of the reliable network address of the first sender and the reliable network address of the second sender;
Use of the reliable network address of the first sender and the reliable network address of the second sender by a common organization;
Use of the reliable network address of the first sender and the reliable network address of the second sender by two related organizations;
Use of the reliable network address of the first sender and the reliable network address of the second sender by a common Internet Service Provider;
Use of the reliable network address of the first sender and the reliable network address of the second sender by a common Internet Service Provider Point of Presence; and
Association of the reliable network address of the first sender and the reliable network address of the second sender with proximate geographical locations.

10. The computer-implemented method of claim 8, wherein at least one of the reliable network addresses is a reliable network address selected from the group consisting of: An IP address, an IP address together with a UDP port number, a TCP session handle, and a physical interface identifier.

11. The computer-implemented method of claim 8, wherein at least one of the first and second secrets is a secret selected from the group consisting of: A secret kept by a device, a secret HTTP cookie, a secret HTTP secure cookie, an SMTP header, an HTTP header, a hardware identifier, a secret kept in a software component installed on the device, a secret assigned to a person for online use, a username and password, a secret URL, a network address, an IP address, a UDP port number, and a TCP session handle.

12. The computer-implemented method of claim 1, wherein the second person identifier is considered to identify the second sender if at least one second person identifier condition is true, the second person identifier condition being selected from the group consisting of:
the second person identifier was verified using a standard method for verification of a person identifier;
the second person identifier was verified by performing a successful offline action based on the second person identifier;
the second person identifier was verified by successfully charging an account;
the second person identifier was verified by receiving online a code sent to a mailing address;
the second person identifier was verified by receiving online a code sent in a phone call;
the second person identifier was verified by receiving, during a phone call, a code sent online;
the second person identifier was received in conditions atypical of fraud;
the second person identifier was sent a considerable period of time before the first person identifier was sent;
the second person identifier was sent a considerable period of time after the first person identifier was sent;
the second person identifier was sent to a service that fraudsters lack incentive to defraud;
the second person identifier is associated with significant online activity typical of legitimate users;
the second person identifier was provided by a trustable authorized agent of the sender of the second person identifier; and
the second person identifier was verified using the trustable authorized agent.

13. The computer-implemented method of claim 1 wherein the estimating is effected using at least one estimating method selected from the group consisting of:
Rule-based logic;
An automatic learning technology;
A neural network; and
Probabilistic analysis.

14. The computer-implemented method of claim 2 wherein the Verification Report includes at least one information element selected from the group consisting of:
A positive response;
A negative response;
the second person identifier;
Verification Information of the second person identifier;
A score describing a probability that the first person identifier and the second person identifier satisfy a Same Person Condition;
A score describing a probability that the first sender and the second sender satisfy a Same Sender Condition;
A score describing a probability that the second person identifier identifies the second sender; and A score describing a probability that the first person identifier identifies the first sender.

15. The computer-implemented method of claim 14 wherein the score describing the probability that the first person identifier identifies the first sender is based on at least one parameter selected from the group consisting of:
   A probability that the first person identifier and the second person identifier satisfy a Same Person Condition;
   A probability that the first sender and the second sender satisfy a Same Sender Condition;
   A probability that the second person identifier identifies the second sender;
   Difficulty in gaining access to a secret upon which the Same Sender Condition is based;
   Reliability of an address of the first sender;
   Reliability of an address of the second sender;
   Accuracy and reliability of external data sources used in estimating;
   Popularity of the first person identifier;
   Popularity of the second person identifier;
   Tendency of people to change a person identifier;
   Time elapsed between sending of the first person identifier and sending of the second person identifier; and
   Time elapsed since charging an account identified by the second person identifier.

16. The computer-implemented method of claim 1, wherein the estimating further includes:
   Sending at least one query to at least one Person Identifier Directory; and
   Receiving at least one response to the at least one query.

17. The computer-implemented method of claim 1, further including generating at least one hash of at least a part of at least one information element selected from the group consisting of:
   the first person identifier; and
   the second person identifier.

18. The computer-implemented method of claim 17 further including determining a size of the at least one hash, based on at least one consideration selected from the group consisting of:
   Information confidentiality; and
   An acceptable level of false verifications.

19. The computer-implemented method of claim 1 wherein an entity receiving the first person identifier from the first sender is different than an entity receiving the second person identifier from the second sender.

20. The computer-implemented method of claim 1, wherein estimating is repeated with at least one person identifier other than the second person identifier.

21. The computer-implemented method of claim 1, further including choosing which person identifier from a plurality of person identifiers to use as the second person identifier.

22. The computer-implemented method of claim 1, further including obtaining at least one sender identifier from the first sender.

23. The computer-implemented method of claim 1, further including combining results of the estimating with results of at least one other method of verifying a person identifier.

24. The computer-implemented method of claim 1, wherein at least one person identifier selected from the group consisting of the first person identifier and the second person identifier includes at least one information element selected from the group consisting of: a full name, a first name, a middle name, a last name, name initials, a title, an address, a country, a state, a city, a street address, an apartment number, a zip code, a phone number, an email address, a financial account number, a credit card number, a bank account number, a government-issued identifier, a social security number, a driver's license number, a national ID number, a passport number, personal characteristics, a height, a weight, a gender, a complexion, a race, and a hair color.

25. The computer-implemented method of claim 1, wherein the first person identifier is sent via a data network selected from the group comprising: the Internet, a private data network, a CATV data network and a mobile data network.

26. A computer-implemented system for verifying a first person identifier comprising:
   A Receiver for receiving a Verification Request including the first person identifier in a first message sent via a data network by a first sender; and
   A Verification Estimator for estimating whether Verification Conditions are true, the Verification Conditions including: whether the first person identifier and a second person identifier satisfy a Same Person Condition, the second person identifier being received in a second message at a different time from a time when the first message is received, the second message being sent via the data network by a second sender, wherein the Same Person Condition is satisfied if the first person identifier and the second person identifier have a Same Person Relation that includes at least one relation between the first person identifier and the second person identifier selected from the group consisting of: the first person identifier and the second person identifier include substantially similar portions, the first person identifier and the second person identifier are verified against encrypted person identifier information stored in a user device, the encrypted person identifier information being accessed upon request to an encrypting authority, the first person identifier and the second person identifier include geographically proximate geographical parameters, and each of the first person identifier and the second person identifier has a respective Same Person Relation with a third person identifier, whether the first sender and the second sender satisfy a Same Sender Condition, wherein the Same Sender Condition is satisfied if, based on a comparison between information associated with the first message and information associated with the second message, the first message and the second message have a Same Sender Relation that includes at least one relation, between the first message and the second message, selected from the group consisting of: there is a relation between a reliable network address of the first sender and a reliable network address of the second sender, a first secret known to the first sender and a second secret contained in the second message are derivatives of a common secret, and each of the first message and the second message has a respective Same Sender Relation with a third message, and whether the second person identifier, previously determined to satisfy a Same Person Condition in relation to the first person identifier, identifies the second sender, previously determined to satisfy a Same Sender Condition in relation to the first sender.

27. The computer-implemented system of claim 26, further comprising a Reporter for sending a Verification Report indicating whether the first person identifier identifies the first sender, the Verification Report being based on output of the Verification Estimator.

28. The computer-implemented system of claim 26, further including a Person Identifier Directory Query Module for sending a query to a Person Identifier Directory and receiving a response to the query, the response then used by the Verification Estimator.

29. The computer-implemented system of claim 28, further including at least one Person Identifier Directory.

30. The computer-implemented system of claim 26, further including a Person Identifier-Sender Identifier Database Query Module for sending a query to at least one Person Identifier-Sender Identifier Database and receiving a response to the query, the response then used by the Verification Estimator.

31. The computer-implemented system of claim 30, further including at least one Person Identifier-Sender Identifier Database.

32. The computer-implemented system of claim 26, further including a Hash Generator for generating at least one hash of at least a part of at least one information element selected from the group comprising:
 the first person identifier; and
 the second person identifier.

* * * * *

UNITED STATES PATENT AND TRADEMARK OFFICE
CERTIFICATE OF CORRECTION

PATENT NO. : 8,650,103 B2  Page 1 of 1
APPLICATION NO. : 10/492920
DATED : February 11, 2014
INVENTOR(S) : Wilf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1581 days.

Signed and Sealed this

Twenty-ninth Day of September, 2015

Michelle K. Lee
*Director of the United States Patent and Trademark Office*